US011224971B2

United States Patent
Laurent et al.

(10) Patent No.: US 11,224,971 B2
(45) Date of Patent: Jan. 18, 2022

(54) PREDICTIVE ROBOTIC CONTROLLER APPARATUS AND METHODS

(71) Applicant: Brain Corporation, San Diego, CA (US)

(72) Inventors: Patryk Laurent, San Diego, CA (US); Jean-Baptiste Passot, Solana Beach, CA (US); Oleg Sinyavskiy, San Diego, CA (US); Filip Ponulak, San Diego, CA (US); Borja Ibarz Gabardos, London (GB); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 178 days.

(21) Appl. No.: 16/447,261

(22) Filed: Jun. 20, 2019

(65) Prior Publication Data

US 2019/0366538 A1 Dec. 5, 2019

Related U.S. Application Data

(63) Continuation of application No. 15/960,300, filed on Apr. 23, 2018, now Pat. No. 10,369,694, which is a
(Continued)

(51) Int. Cl.
*B25J 9/16* (2006.01)
*G06N 3/00* (2006.01)
*G06N 3/04* (2006.01)

(52) U.S. Cl.
CPC .............. *B25J 9/163* (2013.01); *G06N 3/008* (2013.01); *G06N 3/049* (2013.01); *G05B 2219/39271* (2013.01); *G05B 2219/39289* (2013.01)

(58) Field of Classification Search
CPC combination set(s) only.
See application file for complete search history.

(56) References Cited

U.S. PATENT DOCUMENTS 5,063,603 A * 11/1991 Burt .................. G06K 9/00255
382/115
5,092,343 A * 3/1992 Spitzer ............... G06K 9/00536
600/515
(Continued)

FOREIGN PATENT DOCUMENTS

WO WO 2014/151926 A2 * 9/2014
WO WO 2014/151964 A1 * 9/2014
WO WO 2015/116271 A2 * 8/2015

OTHER PUBLICATIONS

"An unsupervised neural network for low-level control of a wheeled mobile robot: noise resistance, stability, and hardware implementation;" P. Gaudiano, E. Zalama, J.L. Coronado; IEEE Transactions on Systems, Man, and Cybernetics, Part B (Cybernetics) (vol. 26, Issue: 3, pp. 485-496); Jun. 1, 1996.*
(Continued)

*Primary Examiner* — Khoi H Tran
*Assistant Examiner* — Jorge O Peche
(74) *Attorney, Agent, or Firm* — Reed Smith LLP; Sidharth Kapoor

(57) ABSTRACT

Robotic devices may be trained by a user guiding the robot along target action trajectory using an input signal. A robotic device may comprise an adaptive controller configured to generate control signal based on one or more of the user guidance, sensory input, performance measure, and/or other information. Training may comprise a plurality of trials, wherein for a given context the user and the robot's controller may collaborate to develop an association between the context and the target action. Upon developing the association, the adaptive controller may be capable of gen-
(Continued)

erating the control signal and/or an action indication prior and/or in lieu of user input. The predictive control functionality attained by the controller may enable autonomous operation of robotic devices obviating a need for continuing user guidance.

14 Claims, 13 Drawing Sheets

Related U.S. Application Data continuation of application No. 15/132,003, filed on Apr. 18, 2016, now Pat. No. 9,950,426, which is a continuation of application No. 13/918,620, filed on Jun. 14, 2013, now Pat. No. 9,314,924.

(56) References Cited

U.S. PATENT DOCUMENTS

| | | | | |
|---|---|---|---|---|
| 5,245,672 A * | 9/1993 | Wilson | G06K 9/00463 | 382/155 |
| 5,355,435 A * | 10/1994 | DeYong | G06N 3/049 | 706/26 |
| 5,388,186 A * | 2/1995 | Bose | G05B 13/027 | 706/10 |
| 5,408,588 A * | 4/1995 | Ulug | G06K 9/4604 | 706/25 |
| 5,467,428 A * | 11/1995 | Ulug | G06N 20/00 | 706/25 |
| 5,638,359 A * | 6/1997 | Peltola | H04L 47/10 | 370/229 |
| 5,673,367 A * | 9/1997 | Buckley | B25J 9/1612 | 706/23 |
| 5,687,294 A * | 11/1997 | Jeong | G05D 1/0255 | 700/258 |
| 5,875,108 A * | 2/1999 | Hoffberg | H04N 21/42201 | 700/17 |
| 6,009,418 A * | 12/1999 | Cooper | G06N 3/0454 | 706/15 |
| 6,014,653 A * | 1/2000 | Thaler | G06N 3/105 | 706/16 |
| 6,272,479 B1 * | 8/2001 | Farry | G06K 9/6217 | 706/13 |
| 6,363,369 B1 * | 3/2002 | Liaw | G06N 3/049 | 706/15 |
| 6,458,157 B1 * | 10/2002 | Suaning | A61F 2/14 | 623/6.63 |
| 6,545,705 B1 * | 4/2003 | Sigel | G07C 1/24 | 348/157 |
| 6,545,708 B1 * | 4/2003 | Tamayama | H04N 5/23299 | 348/211.8 |
| 6,546,291 B2 * | 4/2003 | Merfeld | A61B 5/1112 | 607/62 |
| 6,581,046 B1 * | 6/2003 | Ahissar | G06N 3/049 | 706/15 |
| 6,601,049 B1 * | 7/2003 | Cooper | G06N 3/0454 | 706/15 |
| 7,324,870 B2 * | 1/2008 | Lee | G05D 1/0242 | 700/245 |
| 7,672,920 B2 * | 3/2010 | Ito | G06N 3/0445 | 706/30 |
| 7,849,030 B2 * | 12/2010 | Ellingsworth | G06F 16/353 | 706/20 |
| 8,271,134 B2 * | 9/2012 | Kato | B25J 9/163 | 700/253 |
| 8,315,305 B2 * | 11/2012 | Petre | G06T 9/002 | 375/240.01 |
| 8,419,804 B2 * | 4/2013 | Herr | A61F 2/72 | 623/24 |
| 8,655,815 B2 * | 2/2014 | Palmer | G06N 3/06 | 706/26 |
| 9,082,079 B1 * | 7/2015 | Coenen | G06N 3/08 | |
| 9,186,793 B1 * | 11/2015 | Meier | B60K 11/02 | |
| 9,189,730 B1 * | 11/2015 | Coenen | G06N 3/049 | |
| 2002/0038294 A1 * | 3/2002 | Matsugu | G06N 3/063 | 706/20 |
| 2002/0103576 A1 * | 8/2002 | Takamura | B25J 9/163 | 700/245 |
| 2004/0128028 A1 * | 7/2004 | Miyamoto | B62D 57/032 | 700/245 |
| 2004/0131998 A1 * | 7/2004 | Marom | A61N 1/3603 | 434/236 |
| 2004/0193670 A1 * | 9/2004 | Langan | G06E 3/005 | 708/819 |
| 2005/0015351 A1 * | 1/2005 | Nugent | G06N 3/063 | 706/33 |
| 2005/0036649 A1 * | 2/2005 | Yokono | G06K 9/00228 | 382/100 |
| 2005/0113973 A1 * | 5/2005 | Endo | B25J 13/08 | 700/245 |
| 2005/0119791 A1 * | 6/2005 | Nagashima | G06N 3/008 | 700/253 |
| 2005/0283450 A1 * | 12/2005 | Matsugu | G06N 3/049 | 706/20 |
| 2006/0082340 A1 * | 4/2006 | Watanabe | B25J 9/163 | 318/568.21 |
| 2006/0129277 A1 * | 6/2006 | Wu | G16H 50/50 | 700/245 |
| 2006/0149489 A1 * | 7/2006 | Joublin | B25J 9/163 | 702/92 |
| 2006/0161218 A1 * | 7/2006 | Danilov | A61M 21/00 | 607/45 |
| 2006/0167530 A1 * | 7/2006 | Flaherty | A61B 5/24 | 607/62 |
| 2006/0189900 A1 * | 8/2006 | Flaherty | G06N 3/061 | 600/595 |
| 2007/0022068 A1 * | 1/2007 | Linsker | G05B 13/026 | 706/23 |
| 2007/0176643 A1 * | 8/2007 | Nugent | H03K 19/02 | 326/104 |
| 2007/0208678 A1 * | 9/2007 | Matsugu | G06N 3/049 | 706/18 |
| 2007/0250464 A1 * | 10/2007 | Hamilton | G06N 5/02 | 706/14 |
| 2008/0024345 A1 * | 1/2008 | Watson | H03M 1/12 | 341/155 |
| 2008/0162391 A1 * | 7/2008 | Izhikevich | G06N 20/00 | 706/25 |
| 2009/0043722 A1 * | 2/2009 | Nugent | G06N 3/084 | 706/25 |
| 2009/0105786 A1 * | 4/2009 | Fetz | A61N 1/36103 | 607/48 |
| 2009/0287624 A1 * | 11/2009 | Rouat | G06K 9/4623 | 706/20 |
| 2009/0312817 A1 * | 12/2009 | Hogle | A61N 1/0548 | 607/54 |
| 2010/0086171 A1 * | 4/2010 | Lapstun | G06K 19/06037 | 382/100 |
| 2010/0166320 A1 * | 7/2010 | Paquier | G06K 9/4623 | 382/209 |
| 2010/0198765 A1 * | 8/2010 | Fiorillo | G06N 3/049 | 706/21 |
| 2011/0016071 A1 * | 1/2011 | Guillen | G06N 3/10 | 706/27 |
| 2011/0119214 A1 * | 5/2011 | Breitwisch | G06N 3/0635 | 706/33 |
| 2011/0119215 A1 * | 5/2011 | Elmegreen | G06N 3/0635 | 706/37 |
| 2011/0160741 A1 * | 6/2011 | Asano | A61B 17/221 | 606/127 |
| 2011/0231016 A1 * | 9/2011 | Goulding | G01C 21/20 | 700/246 |
| 2012/0011090 A1 * | 1/2012 | Tang | G06N 3/0635 | 706/33 |
| 2012/0011093 A1 * | 1/2012 | Aparin | G06N 3/049 | 706/33 |
| 2012/0036099 A1 * | 2/2012 | Venkatraman | G06N 3/049 | 706/27 |

(56) References Cited

U.S. PATENT DOCUMENTS

| | | | |
|---|---|---|---|
| 2012/0109866 A1* | 5/2012 | Modha | G06N 3/088 706/28 |
| 2012/0197439 A1* | 8/2012 | Wang | G05D 1/0038 700/259 |
| 2012/0296471 A1* | 11/2012 | Inaba | B25J 9/163 700/253 |
| 2012/0303091 A1* | 11/2012 | Izhikevich | G16H 40/63 607/54 |
| 2012/0308076 A1* | 12/2012 | Piekniewski | G06N 3/049 382/103 |
| 2012/0308136 A1* | 12/2012 | Izhikevich | G06N 3/008 382/181 |
| 2013/0073080 A1* | 3/2013 | Ponulak | B25J 9/1635 700/246 |
| 2013/0073491 A1* | 3/2013 | Izhikevich | G06N 3/049 706/15 |
| 2013/0073493 A1* | 3/2013 | Modha | G06N 3/04 706/25 |
| 2013/0073496 A1* | 3/2013 | Szatmary | G06N 7/00 706/25 |
| 2013/0073500 A1* | 3/2013 | Szatmary | G06N 3/04 706/27 |
| 2013/0151450 A1* | 6/2013 | Ponulak | G06N 3/049 706/25 |
| 2013/0218821 A1* | 8/2013 | Szatmary | G06F 8/355 706/25 |
| 2013/0297541 A1* | 11/2013 | Piekniewski | G06N 3/088 706/26 |
| 2013/0310979 A1* | 11/2013 | Herr | B62D 57/032 700/258 |
| 2013/0325244 A1* | 12/2013 | Wang | G06T 11/00 701/26 |
| 2013/0325766 A1* | 12/2013 | Petre | G06N 3/049 706/15 |
| 2013/0325768 A1* | 12/2013 | Sinyavskiy | G06N 3/049 706/16 |
| 2013/0325773 A1* | 12/2013 | Sinyavskiy | G05B 13/027 706/23 |
| 2013/0325774 A1* | 12/2013 | Sinyavskiy | G06N 3/049 706/23 |
| 2013/0325775 A1* | 12/2013 | Sinyavskiy | G06N 20/00 706/25 |
| 2013/0325776 A1* | 12/2013 | Ponulak | G05B 13/027 706/25 |
| 2013/0325777 A1* | 12/2013 | Petre | G06N 3/049 706/26 |
| 2014/0016858 A1* | 1/2014 | Richert | G06K 9/4671 382/156 |
| 2014/0025613 A1* | 1/2014 | Ponulak | G06N 3/08 706/25 |
| 2014/0032458 A1* | 1/2014 | Sinyavskiy | G06N 3/049 706/16 |
| 2014/0193066 A1* | 7/2014 | Richert | G06K 9/00986 382/158 |
| 2015/0148956 A1* | 5/2015 | Negishi | B25J 9/163 700/253 |
| 2015/0217449 A1* | 8/2015 | Meier | G05B 13/027 700/257 |
| 2015/0283701 A1* | 10/2015 | Izhikevich | G05D 1/0022 700/250 |
| 2015/0283702 A1* | 10/2015 | Izhikevich | G05D 1/0022 700/257 |
| 2015/0283703 A1* | 10/2015 | Izhikevich | G05D 1/0246 706/11 |
| 2015/0336268 A1* | 11/2015 | Payton | G05B 19/423 700/261 |
| 2016/0096272 A1* | 4/2016 | Smith | B25J 9/0081 700/253 |
| 2020/0039082 A1* | 2/2020 | Kapoor | B25J 9/1656 |

OTHER PUBLICATIONS

"A Symbiotic Brain-Machine Interface through Value-Based Decision Making;" Mahmoudi, Babak, Sanchez, Justin C. ; PLoS ONE, 6(3), e14760; Mar. 14, 2011.*

Prior parent application U.S. Appl. No. 15/960,300.

* cited by examiner

PREDICTIVE ROBOTIC CONTROLLER APPARATUS AND METHODS

PRIORITY

This application is a continuation of U.S. patent application Ser. No. 15/960,300 filed on Apr. 23, 2018, which is a continuation of U.S. patent application Ser. No. 15/132,003 filed on Apr. 18, 2016, now U.S. Pat. No. 9,950,426, which is a continuation of U.S. patent application Ser. No. 13/918,620 filed on Jun. 14, 2013, now U.S. Pat. No. 9,314,924, each of the foregoing being incorporated herein by reference in their entirety.

CROSS-REFERENCE TO RELATED APPLICATIONS

This application is related to co-owned U.S. patent application Ser. No. 13/918,338 entitled "ROBOTIC TRAINING APPARATUS AND METHODS", filed Jun. 14, 2013, now U.S. Pat. No. 9,384,443, co-owned U.S. patent application Ser. No. 13/918,298 entitled "HIERARCHICAL ROBOTIC CONTROLLER APPARATUS AND METHODS", filed Jun. 14, 2013, now U.S. Pat. No. 9,792,546, co-owned U.S. patent application Ser. No. 13/907,734 entitled "ADAPTIVE ROBOTIC INTERFACE APPARATUS AND METHODS", filed May 31, 2013 now U.S. Pat. No. 9,242,372, co-owned U.S. patent application Ser. No. 13/842,530 entitled "ADAPTIVE PREDICTOR APPARATUS AND METHODS", filed Mar. 15, 2013, now U.S. Pat. No. 9,764,468, co-owned U.S. patent application Ser. No. 13/842,562 entitled "ADAPTIVE PREDICTOR APPARATUS AND METHODS FOR ROBOTIC CONTROL", filed Mar. 15, 2013, co-owned U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, co-owned U.S. patent application Ser. No. 13/842,647 entitled "MULTICHANNEL ROBOTIC CONTROLLER APPARATUS AND METHODS", filed Mar. 15, 2013, and co-owned U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to adaptive control and training of robotic devices.

Background

Robotic devices are used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots (e.g., iRobot Roomba®) may learn to operate via exploration.

Programming robots may be costly and remote control may require a human operator. Furthermore, changes in the robot model and/or environment may require changes in the programming code. Remote control typically relies on user experience and/or agility that may be inadequate when dynamics of the control system and/or environment (e.g., an unexpected obstacle appears in path of a remotely controlled vehicle) change rapidly.

SUMMARY

One aspect of the disclosure relates to a computerized controller apparatus configured to effectuate control of a robotic device. The apparatus may comprise one or more processors configured to execute computer program modules. The computer program modules may be executable to cause one or more processors to: (1) during a first plurality of training trials: determine a given first control signal of a plurality of first control signals based on (i) a characteristic of an input provided to the controller apparatus by the robotic device and (ii) a user input; and cause the robotic device to perform a first action based on the given first control signal, the first action being characterized by a first performance; and (2) during a training trial subsequent to the first plurality of training trials: determine a second control signal based on the characteristic of the input and the first performance; and cause the robotic device to perform a second action based on the second control signal. The second control signal may be determined absent of a provision of user input subsequent to termination of the first plurality of training trials and prior to generation of the second control signal.

In some implementations, the first performance may be determined based on a proximity measure between the first action and a target action. The second action may be characterized by a second performance determined based on a proximity measure between the second action and the target action.

Another aspect of the disclosure relates to a robotic apparatus. The apparatus may comprise a platform and a controller. The platform may comprise one or more controllable elements. The controller may comprise one or more processors configured to execute computer program modules configured to operate individual ones of the one or more controllable elements. The computer program modules may comprise a first logic module, a second logic module, and a third logic module. The first logic module may be configured to receive from a teacher a first teaching action indication of a plurality of teaching action indications. The second logic module may be configured to cause the platform to perform an action in accordance with a first signal configured based on the first teaching action indication and a sensory signal. The third logic module may be configured to generate an action indication based on the sensory signal and analysis of individual ones of a plurality of first signals. The plurality of first signals may be configured based on individual ones of the plurality of teaching action indications and the sensory signal. The plurality of first signals may comprise the first signal. The action indication may be configured to cause the platform to perform the action in accordance with a second signal. The second signal may be configured based on the action indication and the sensory signal.

In some implementations, the target action may correspond to operation of the platform based on teaching input from the teacher. The analysis of individual ones of the plurality of first signals may comprise determining of a deviation between the first action and a target action. The analysis may be configured to cause modification of a controller state in accordance with a learning process. The learning process may be configured based on a performance measure.

In some implementations, the second logic module may comprise a predictor sub-module configured to determine a predicted control output based on a characteristic of the sensory signal. The sensory signal may convey information associated with one or both of an environment of the robotic apparatus and a platform state. The first input and the second input may be configured based on the sensory signal. The action may be configured based on the predicted control output.

In some implementations, the predictor sub-module may be configured to provide a table configured to store a plurality of teaching inputs, a plurality of sensory signal characteristics, and a plurality of predicted control outputs. The analysis may comprise selecting a given predicted control output based on a match between a given characteristic of sensory signal and an individual one of the plurality of sensory signal characteristics.

In some implementations, the given predicted control may be configured based on a search of the table. The search may be configured based on the teaching input.

In some implementations, the third logic module may comprise a combiner sub-module configured to determine a combined output based on the predicted control output and first user input. The combined output may be characterized by a transform function configured to combine the predicted control output and the first signal via one or more operations including an additive operation.

In some implementations, the transform function may be configured to combine the predicted control output and the control output via one or more operations including a union operation.

In some implementations, the learning process may comprise a supervised learning process configured based on the combined output. The learning process may be configured to be updated at time intervals. The modification of the controller may be based on an error measure between (i) the predicted control output generated at a first time instance and (ii) the first input determined at second time instance subsequent to the first time instance. The first time instance and the second time instance may be separated by one of the time intervals.

In some implementations, the teacher may comprise a human trainer. The second input may be configured to cause a corrective action by the platform. The action undergoing correction may be characterized by a lower deviation from a target action. The action undergoing correction may be effectuated based on a cooperative interaction with the human. The cooperative interaction may be characterized by a plurality of training iterations. The first input may correspond to a first given iteration of the plurality of training iterations. The second input may correspond to a second given iteration of the plurality of training iterations. The second given iteration may occur subsequent to the first given iteration.

In some implementations, the second logic module may comprise a predictor sub-module configured to determine a plurality of predicted control outputs based on a characteristic of a sensory signal and a given user input. The sensory signal may be configured to convey information about one or both of an environment of the robotic apparatus and a plant state. The first input and the second input may be configured based on the sensory signal. The action may be configured based on a first predicted control output of the plurality of predicted control outputs. The first predicted control output may correspond to the first input. The corrected action may be configured based on a second predicted control output of the plurality of predicted control outputs. The second predicted control output may correspond to the second input. The corrected action may be characterized by an improved performance as compared to the action and a target action. The improved performance may be quantified based on a lower deviation of the corrected action from the target action compared to a deviation between the action and the target action. The target action may be based solely on a training input by the human absent a predicted control output.

In some implementations, the second signal may be generated by the controller based on a plurality of action indications being generated by the third logic and absent an explicit indication by the teacher.

In some implementations, the second signal may be generated by the controller responsive to a confirmation provided by the teacher. The second signal may be generated based on a confirmation indication from the teacher.

Yet another aspect of the disclosure relates to a method of training a computerized robotic apparatus to perform a target action based on sensory context. The training may be effectuated via a plurality of iterations. The method may comprise: during a first portion of the plurality of iterations: causing the apparatus to perform an action based on a first control signal generated based on the sensory context and a target action indication provided by a user; and causing the apparatus to adjust a controller learning parameter based on a first performance determined based on the first action and the target action; and during a second portion of the plurality of iterations, the second portion being subsequent to the first portion: causing the apparatus to generate an action signal based on the sensory context and the adjusted learning parameter, the action signal generation occurring prior to provision of the target action signal associated with the subsequent iteration; and causing the apparatus to perform the action based on a second control signal generated based on the sensory context and the action signal but absent the provision of the target action indication by the user. The action performance based on the second control signal may be characterized by a second performance. Provision of the target action indication by the user during the second portion of the plurality of iterations may be configured to cause performance execution of another action characterized by a third performance. The third performance value may be lower than the second performance value.

In some implementations, the performance measure may be determined by the controller. The third performance value may be lower than the first performance value.

In some implementations, the controller learning parameter adjustment may be configured based on a supervised learning process configured based on the sensory context and a combination of the control signal and the user input. The third performance value may be lower than the second performance value.

In some implementations, the sensory context may comprise an object representation. The target action may comprise at least one of an object approach maneuver or an object avoidance maneuver.

In some implementations, individual ones of the first portion of the plurality of iterations may be characterized by a time interval between an onset of the sensory context and provision of the user input. A time period between the onset of the sensory context during the second portion of the plurality of iterations and the action signal generation is no greater than a minimum value of the time interval.

In some implementations, individual ones of the first portion of the plurality of iterations may be characterized by a time interval between an onset of the sensory context and provision of the user input. A time period between the onset of the sensory context during the second portion of the plurality of iterations iteration and the action signal generation may be no less than at least one of a mean value of the time interval or a median value of the time interval.

In some implementations, a concluding iteration of the first portion of the plurality of iterations may be characterized by a concluding target action signal being provided by the user. The concluding iteration may be the last iteration of the first portion of the plurality of iterations. The concluding target action may be a target action associated with the concluding iteration. The generation of the action signal may be characterized by the absence of another target action signal being provided by the user within a time period subsequent to time of the concluding target action signal provision and a time of the action signal generation.

In some implementations, the target action signal may comprise a user control signal. The first control signal may comprise a combination of the user control signal and a predicted control signal generated by the apparatus. An action performance during individual ones of the first portion of the plurality of iterations may be configured based on the combination of the user control signal and the predicted control signal generated by the apparatus. Performing the action based solely on the user control signal or the predicted control signal may be characterized by a fourth performance value and a fifth performance value, respectively. The fourth performance value and the fifth performance value may be less than the first performance value.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
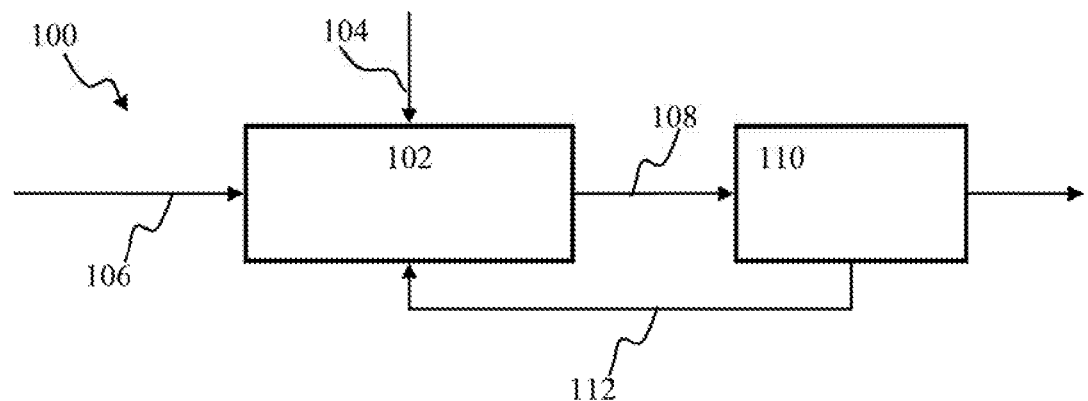
FIG. 1 is a block diagram illustrating a robotic apparatus, according to one or more implementations.

All Figures disclosed herein are © Copyright 2018 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables (e.g., a membrane potential, firing threshold and/or other) used to describe state of a network node.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1 illustrates one implementation of an adaptive robotic apparatus for use with the robot training methodology described hereinafter. The apparatus 100 of FIG. 1 may comprise an adaptive controller 102 and a plant (e.g., robotic platform) 110. The controller 102 may be configured to generate control output 108 for the plant 110. The output 108 may comprise one or more motor commands (e.g., pan camera to the right), sensor acquisition parameters (e.g., use high resolution camera mode), commands to the wheels, arms, and/or other actuators on the robot, and/or other parameters. The output 108 may be configured by the controller 102 based on one or more sensory inputs 106. The input 106 may comprise data used for solving a particular control task. In one or more implementations, such as those involving a robotic arm or autonomous robot, the signal 106 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the signal 106 may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 106 may comprise a target motion trajectory. The motion trajectory may be used to predict a future state of the robot on the basis of a current state and the target state. In one or more implementations, the signals in FIG. 1 may be encoded as spikes.

The controller 102 may be operable in accordance with a learning process (e.g., reinforcement learning and/or supervised learning). In one or more implementations, the controller 102 may optimize performance (e.g., performance of the system 100 of FIG. 1) by minimizing average value of a performance function as described in detail in co-owned U.S. patent application Ser. No. 13/487,533, entitled "SYSTEMS AND APPARATUS FOR IMPLEMENTING TASK-SPECIFIC LEARNING USING SPIKING NEURONS", now U.S. Pat. No. 9,146,546, incorporated herein by reference in its entirety.

Learning process of adaptive controller (e.g., 102 of FIG. 1) may be implemented using a variety of methodologies. In some implementations, the controller 102 may comprise an artificial neuron network e.g., spiking neuron network described in co-owned U.S. patent application Ser. No. 13/487,533, entitled "SYSTEMS AND APPARATUS FOR IMPLEMENTING TASK-SPECIFIC LEARNING USING SPIKING NEURONS", now U.S. Pat. No. 9,146,546, incorporated supra, configured to control, for example, a robotic rover.

Individual spiking neurons may be characterized by internal state q. The internal state q may, for example, comprise a membrane voltage of the neuron, conductance of the membrane, and/or other parameters. The neuron process may be characterized by one or more learning parameter which may comprise input connection efficacy, output connection efficacy, training input connection efficacy, response generating (firing) threshold, resting potential of the neuron, and/or other parameters. In one or more implementations, some learning parameters may comprise probabilities of signal transmission between the units (e.g., neurons) of the network.

In some implementations, the training input (e.g., 104 in FIG. 1) may be differentiated from sensory inputs (e.g., inputs 106) as follows. During learning: data (e.g., spike events) arriving to neurons of the network via input 106 may cause changes in the neuron state (e.g., increase neuron membrane potential and/or other parameters). Changes in the neuron state may cause the neuron to generate a response (e.g., output a spike). Teaching data arriving to neurons of the network may cause (i) changes in the neuron dynamic model (e.g., modify parameters a, b, c, d of Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning): data (e.g., spike events) arriving to neurons of the network may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

In one or more implementations, such as object recognition, and/or obstacle avoidance, the input 106 may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, HSL, grayscale, and/or other representations) and/or frame rates are equally useful with the present invention. Pixels and/or groups of pixels associated with objects and/or features in the input frames may be encoded using, for example, latency encoding described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS", now U.S. Pat. No. 9,195,934, and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in U.S. patent application Ser. No. 13/623,842 filed Sep. 20, 2012, and entitled "SPIKING NEURON NETWORK ADAPTIVE CONTROL APPARATUS AND METHODS", now U.S. Pat. No. 9,367,798, the foregoing being incorporated herein by reference in its entirety. In one or more implementations, analog and/or spiking inputs may be processed by mixed signal spiking neurons, such as co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned and co-pending U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, now U.S. Pat. No. 9,213,937, each of the foregoing being incorporated herein by reference in its entirety.

The rules may be configured to implement synaptic plasticity in the network. In some implementations, the plastic rules may comprise one or more spike-timing dependent plasticity, such as rule comprising feedback described in co-owned U.S. patent application Ser. No. 13/465,903 entitled "SENSORY INPUT PROCESSING APPARATUS IN A SPIKING NEURAL NETWORK", filed May 7, 2012, now U.S. Pat. No. 9,224,090; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012 now U.S. Pat. No. 9,098,811; conditional plasticity rules described in co-owned U.S. patent application Ser. No. 13/541,531, entitled "CONDITIONAL PLASTICITY SPIKING NEURON NETWORK APPARATUS AND METHODS", filed Jul. 3, 2012, now U.S. Pat. No. 9,111,215; plasticity configured to stabilize neuron response rate as described in co-owned U.S. patent application Ser. No. 13/691,554, entitled "RATE STABILIZATION THROUGH PLASTICITY IN SPIKING NEURON NETWORK", filed Nov. 30, 2012 now U.S. Pat. No. 9,275,326; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK" filed Oct. 25, 2012, now U.S. Pat. No. 8,972,315, co-owned U.S. patent application Ser. No. 13/660,945, entitled "MODULATED PLASTICITY APPARATUS AND METHODS FOR SPIKING NEURON NETWORK", filed Oct. 25, 2012 now U.S. Pat. No. 9,111,226; and co-pending U.S. patent application Ser. No. 13/774,934, entitled "APPARATUS AND METHODS FOR RATE-MODULATED PLASTICITY IN A SPIKING NEURON NETWORK", filed Feb. 22, 2013; multi-modal rules described in co-pending U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety Connection efficacy updated may be effectuated using a variety of applicable methodologies such as, for example, event based updates described in detail in U.S. patent application Ser. No. 13/239,255, filed Sep. 21, 2011, entitled "APPARATUS AND METHODS FOR SYNAPTIC UPDATE IN A PULSE-CODED NETWORK", now U.S. Pat. No. 9,147,156; co-pending U.S. patent application Ser. No. 13/588,774, entitled "APPARATUS AND METHODS FOR IMPLEMENTING EVENT-BASED UPDATES IN SPIKING NEURON NETWORKS", filed Aug. 17, 2012; and co-pending U.S. patent application Ser. No. 13/560,891 filed Jul. 27, 2012 and entitled "APPARATUS AND METHODS FOR EFFICIENT UPDATES IN SPIKING NEURON NETWORK", each of the foregoing being incorporated herein by reference in its entirety.

Neuron process may comprise one or more learning rules configured to adjust neuron state and/or generate neuron output in accordance with neuron inputs.

In some implementations, the one or more leaning rules may comprise state dependent learning rules described, for example, in co-owned U.S. patent application Ser. No. 13/560,902, entitled "APPARATUS AND METHODS FOR GENERALIZED STATE-DEPENDENT LEARNING IN SPIKING NEURON NETWORKS", filed Jul. 27, 2012, now U.S. Pat. No. 9,256,215 and/or U.S. patent application Ser. No. 13/722,769 filed Dec. 20, 2012, and entitled "APPARATUS AND METHODS FOR STATE-DEPENDENT LEARNING IN SPIKING NEURON NETWORKS", now U.S. Pat. No. 8,990,133, each of the foregoing being incorporated herein by reference in its entirety.

In one or more implementations, the one or more leaning rules may be configured to comprise one or more reinforcement learning, unsupervised learning, and/or supervised learning as described in co-owned and co-pending U.S. patent application Ser. No. 13/487,499 entitled "STOCHASTIC APPARATUS AND METHODS FOR IMPLEMENTING GENERALIZED LEARNING RULES, incorporated supra.

In one or more implementations, the one or more leaning rules may be configured in accordance with focused exploration rules such as described, for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, the foregoing being incorporated herein by reference in its entirety.

Adaptive controller (e.g., the controller apparatus 102 of FIG. 1) may comprise an adaptable predictor block configured to, inter alia, predict control signal (e.g., 108) based on the sensory input (e.g., 106 in FIG. 1) and teaching input (e.g., 104 in FIG. 1). FIGS. 2A-3B illustrate exemplary adaptive predictor configurations in accordance with one or more implementations.

Figure 2A:
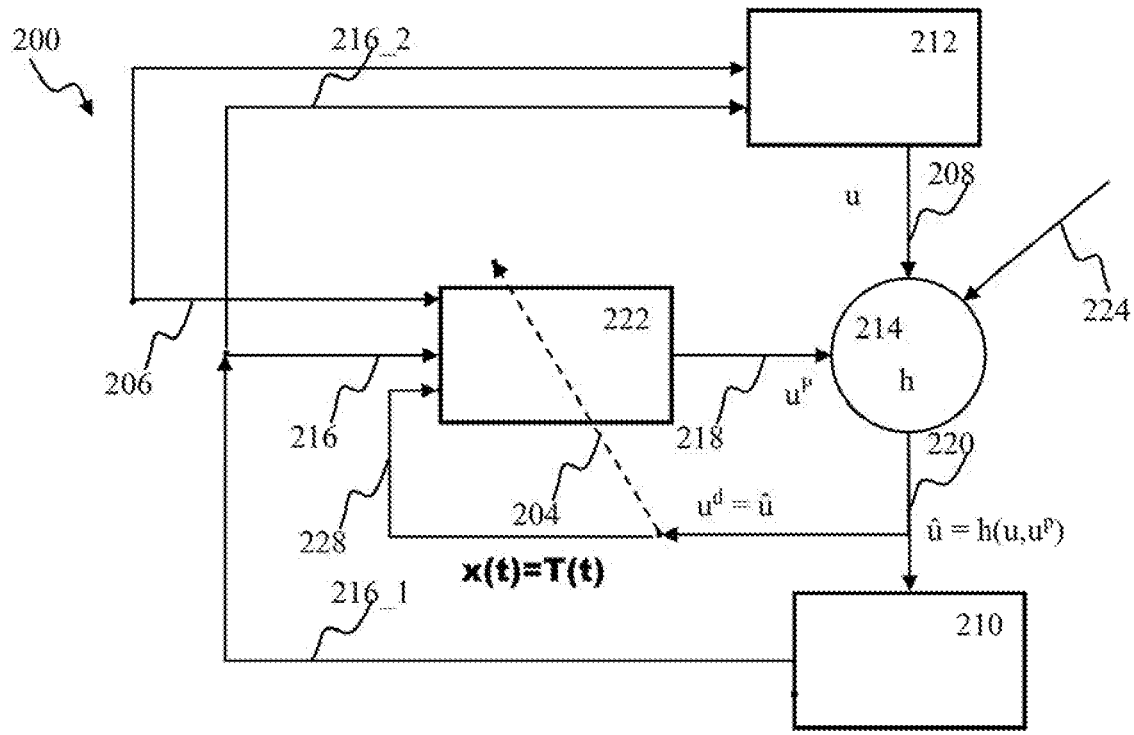
FIG. 2A is a block diagram illustrating a controller apparatus comprising an adaptable predictor block operable in accordance with a teaching signal, according to one or more implementations.

FIG. 2A illustrates an adaptive controller apparatus 200 operable in accordance with a learning process that is based on a teaching signal, according to one or more implementations. The adaptive controller apparatus 200 of FIG. 2A may comprise a control entity 212, an adaptive predictor 222, and a combiner 214. The learning process of the adaptive predictor 222 may comprise supervised learning process, reinforcement learning process, and/or a combination thereof. The control entity 212, the predictor 222 and the combiner 214 may cooperate to produce a control signal 220 for the plant 210. In one or more implementations, the control signal 220 may comprise one or more motor commands (e.g., pan camera to the right, turn right wheel forward), sensor acquisition parameters (e.g., use high resolution camera mode), and/or other parameters.

The control entity 212 may be configured to generate control signal 208 based on one or more of (i) sensory input (denoted 206 in FIG. 2A) and plant feedback 216_2. In some implementations, plant feedback may comprise proprioceptive signals, such as the readings from servo motors, joint position, and/or torque. In some implementations, the sensory input 206 may correspond to the controller sensory input 106, described with respect to FIG. 1, supra. In one or more implementations, the control entity may comprise a human trainer, communicating with the robotic controller via a remote controller and/or joystick. In one or more implementations, the control entity may comprise a computerized agent such as a multifunction adaptive controller operable using reinforcement and/or unsupervised learning and capable of training other robotic devices for one and/or multiple tasks.

The adaptive predictor 222 may be configured to generate predicted control signal $u^P$ 218 based on one or more of (i) the sensory input 206 and the plant feedback 216_1. The predictor 222 may be configured to adapt its internal parameters, e.g., according to a supervised learning rule, and/or other machine learning rules.

Predictor realizations, comprising plant feedback, may be employed in applications such as, for example, wherein (i) the control action may comprise a sequence of purposefully timed commands (e.g., associated with approaching a stationary target (e.g., a cup) by a robotic manipulator arm); and (ii) the plant may be characterized by a plant state time parameter (e.g., arm inertia, and/or motor response time) that may be greater than the rate of action updates. Parameters of a subsequent command within the sequence may depend on the plant state (e.g., the exact location and/or position of the arm joints) that may become available to the predictor via the plant feedback.

The sensory input and/or the plant feedback may collectively be referred to as sensory context. The context may be utilized by the predictor 222 in order to produce the predicted output 218. By way of a non-limiting illustration of obstacle avoidance by an autonomous rover, an image of an obstacle (e.g., wall representation in the sensory input 206) may be combined with rover motion (e.g., speed and/or direction) to generate Context A. When the Context A is encountered, the control output 220 may comprise one or more commands configured to avoid a collision between the rover and the obstacle. Based on one or more prior encounters of the Context A—avoidance control output, the predictor may build an association between these events as described in detail below.

The combiner 214 may implement a transfer function h( ) configured to combine the control signal 208 and the predicted control signal 218. In some implementations, the combiner 214 operation may be expressed as described in detail in U.S. patent application Ser. No. 13/842,530 entitled "ADAPTIVE PREDICTOR APPARATUS AND METHODS", filed Mar. 15, 2013, as follows:

$$\hat{u} = h(u, u^P). \tag{Eqn. 1}$$

Various realizations of the transfer function of Eqn. 1 may be utilized. In some implementations, the transfer function may comprise an addition operation, a union, a logical 'AND' operation, and/or other operations.

In one or more implementations, the transfer function may comprise a convolution operation. In spiking network realizations of the combiner function, the convolution operation may be supplemented by use of a finite support kernel such as Gaussian, rectangular, exponential, and/or other finite support kernel. Such a kernel may implement a low pass filtering operation of input spike train(s). In some implementations, the transfer function may be characterized by a commutative property configured such that:

$$\hat{u} = h(u, u^P) = h(u^P, u). \tag{Eqn. 2}$$

In one or more implementations, the transfer function of the combiner 214 may be configured as follows:

$$h(0, u^P) = u^P. \tag{Eqn. 3}$$

In one or more implementations, the transfer function h may be configured as:

$$h(u, 0) = u. \tag{Eqn. 4}$$

In some implementations, the transfer function h may be configured as a combination of realizations of Eqn. 3-Eqn. 4 as:

$$h(0, u^P) = u^P, \text{ and } h(u, 0) = u. \quad \text{(Eqn. 5)}$$

In one exemplary implementation, the transfer function satisfying Eqn. 5 may be expressed as:

$$h(u, u^P) = (1-u) \times (1-u^P) - 1. \quad \text{(Eqn. 6)}$$

In one such realization, the combiner transfer function configured according to Eqn. 3-Eqn. 6, thereby implementing an additive feedback. In other words, output of the predictor (e.g., 218) may be additively combined with the control signal (208) and the combined signal 220 may be used as the teaching input (204) for the predictor. In some implementations, the combined signal 220 may be utilized as an input (context) signal 228 into the predictor 222.

In some implementations, the combiner transfer function may be characterized by a delay expressed as:

$$\hat{u}(t_{i+1}) = h(u(t_i), u^P(t_i)). \quad \text{(Eqn. 7)}$$

In Eqn. 7, $\hat{u}(t_{i+1})$ denotes combined output (e.g., 220 in FIG. 2A) at time t+Δt. As used herein, symbol $t_N$ may be used to refer to a time instance associated with individual controller update events (e.g., as expressed by Eqn. 7), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity Δt may be configured to be between 1 ms and 1000 ms.

It will be appreciated by those skilled in the art that various other realizations of the transfer function of the combiner 214 (e.g., comprising a Heaviside step function, a sigmoidal function, such as the hyperbolic tangent, Gauss error function, or logistic function, and/or a stochastic operation) may be applicable.

Operation of the predictor 222 learning process may be aided by a teaching signal 204. As shown in FIG. 2A, the teaching signal 204 may comprise the output 220 of the combiner:

$$u^d = \hat{u}. \quad \text{(Eqn. 8)}$$

In some implementations wherein the combiner transfer function may be characterized by a delay τ (e.g., Eqn. 7), the teaching signal at time ti may be configured based on values of u, $u^P$ at a prior time for example as:

$$u^d(t_i) = h(u(t_{i-1}), u^P(t_{i-1})). \quad \text{(Eqn. 9)}$$

The training signal $u^d$ at time $t_i$ may be utilized by the predictor in order to determine the predicted output $u^P$ at a subsequent time $t_{i+1}$, corresponding to the context (e.g., the sensory input x) at time $$u^P(t_{i-1}) = F[x_i, W(u^d(t_i))] \quad \text{(Eqn. 10)}$$

Figure 2B:
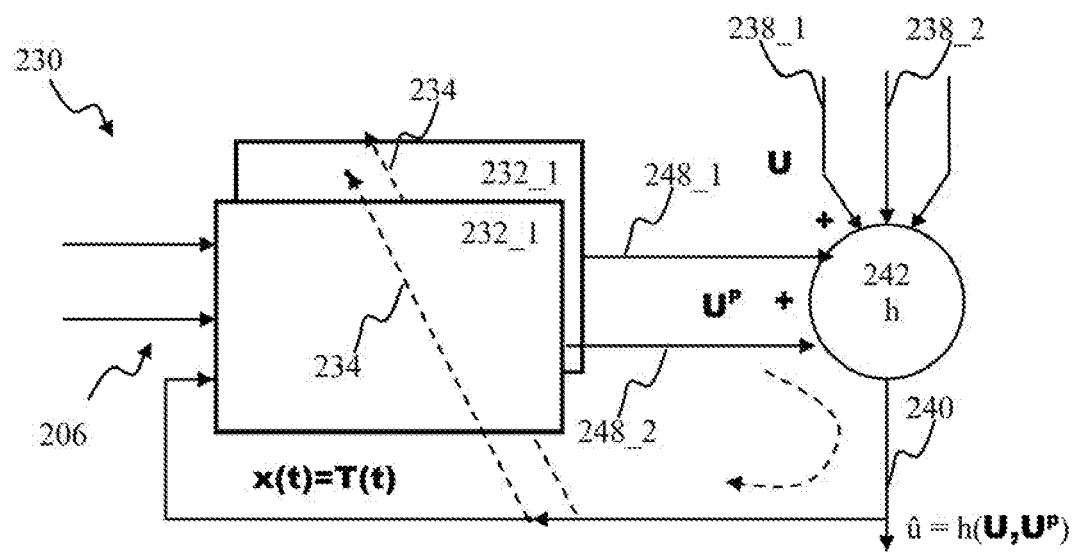
FIG. 2B is a block diagram illustrating a multichannel adaptive predictor apparatus, according to one or more implementations.

In Eqn. 10, the function W may refer to a learning process implemented by the predictor. In one or more implementations, such as illustrated in FIGS. 2A-2B, the sensory input 206/306, the control signal 208/308, the predicted output 218/318, the combined output 220, 340 and/or plant feedback 216, 236 may comprise spiking signal, analog signal, and/or a combination thereof. Analog to spiking and/or spiking to analog signal conversion may be effectuated using, mixed signal spiking neuron networks, such as, for example, described in U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013 now U.S. Pat. No. 9,213,937, incorporated supra.

Output 220 of the combiner e.g., 214 in FIG. 2A, may be gated. In some implementations, the gating information may be provided to the combiner by the control entity 212. In one such realization of spiking controller output, the control signal 208 may comprise positive spikes indicative of a control command and configured to be combined with the predicted control signal (e.g., 218); the control signal 208 may comprise negative spikes, where the timing of the negative spikes is configured to communicate the control command, and the (negative) amplitude sign is configured to communicate the combination inhibition information to the combiner 214 so as to enable the combiner to 'ignore' the predicted control signal 218 for constructing the combined output 220.

In some implementations of spiking signal output, the combiner 214 may comprise a spiking neuron network; and the control signal 208 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 220 in FIG. 2B).

The gating information may be provided to the combiner via a connection 224 from another entity (e.g., a human operator controlling the system with a remote control, and/or external controller) and/or from another output from the controller 212 (e.g. an adapting block, or an optimal controller). In one or more implementations, the gating information delivered via the connection 224 may comprise one or more of: a command, a memory address of a register storing a flag, a message, an inhibitory efficacy, a value (e.g., a weight of zero to be applied to the predicted control signal by the combiner), and/or other information capable of conveying gating instructions to the combiner.

The gating information may be used by the combiner network to inhibit and/or suppress the transfer function operation. The suppression (or 'veto') may cause the combiner output (e.g., 220) to be comprised solely of the control signal portion 218, e.g., configured in accordance with Eqn. 4. In one or more implementations the gating information 224 may be used to suppress ('veto') provision of the context signal 228 to the predictor without affecting the combiner output 220. In one or more implementations the gating information 224 may be used to suppress (veto') the feedback 216_1 from the plant.

In one or more implementations, the gating signal 224 may comprise an inhibitory indication that may be configured to inhibit the output from the combiner. Zero combiner output may, in some realizations, may cause zero teaching signal (e.g., 214 in FIG. 2A) to be provided to the predictor so as to signal to the predictor a discrepancy between the target action (e.g., controller output 208) and the predicted control signal (e.g., output 218).

The gating signal 224 may be used to veto predictor output 218 based on, for example, the predicted control output 218 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

By way of a non-limiting illustration, if the turn is to be completed and/or aborted (due to, for example, a trajectory change and/or sensory input change), and the predictor output may still be producing turn instruction to the plant, the gating signal may cause the combiner to veto (ignore) the predictor contribution and to pass through the controller contribution.

Predicted control signal 218 and the control input 208 may be of opposite signs. In one or more implementations, positive predicted control signal (e.g., 218) may exceed the target output that may be appropriate for performance of as task (e.g., as illustrated by data of trials 8-9 in Table 3). Control signal 208 may be configured to comprise negative signal (e.g., −10) in order to compensate for overprediction by the predictor.

Gating and/or sign reversal of controller output may be useful, for example, responsive to the predictor output being incompatible with the sensory input (e.g., navigating towards a wrong target). Rapid (compared to the predictor learning time scale) changes in the environment (e.g., appearance of a new obstacle, target disappearance), may require a capability by the controller (and/or supervisor) to 'override' predictor output. In one or more implementations compensation for overprediction may be controlled by a graded form of the gating signal delivered via the connection 224.

FIG. 2B illustrates combiner apparatus configured to operate with multichannel control inputs and/or control signals. The combiner 242 of FIG. 2B may receive an M-dimensional (M>1) control input 238. The control input U may comprise a vector corresponding to a plurality of input channels (e.g., 238 1, 238_2 in FIG. 2B). Individual channels, may be configured to communicate individual dimensions (e.g., vectors) of the input U, as described in detail in U.S. patent application Ser. No. 13/842,647 entitled "MULTICHANNEL ROBOTIC CONTROLLER APPARATUS AND METHODS", filed Mar. 15, 2013, incorporated supra. The combiner output 240 may be configured to operate a plant (e.g., the plant 110, in FIG. 1 and/or the plant 210 in FIG. 2A).

In some implementations, the predictor 232 may comprise a single multichannel predictor capable of generating N-dimensional (N>1) predicted signal 248 based on a multichannel training input 234 and sensory input 36. In one or more implementations, the predictor 232 may comprise multiple individual predictor modules (232 1, 232_2) configured to generate individual components of the multi-channel output (248 1, 248_2). In some implementations, individual teaching signal may be de-multiplexed into multiple teaching components (234 1, 234_2). Predictor 232 learning process may be configured to adapt predictor state based on teaching signal 234.

The predicted signal $U^P$ may comprise a vector corresponding to a plurality of output channels (e.g., 238 1, 238_2 in FIG. 2B). Individual channels 248 1, 248_2 may be configured to communicate individual dimensions (e.g., vectors) of the signal 238.

The combiner 242 may be operable in accordance with a transfer function h configured to combine signals 238, 248 and to produce single-dimensional control signal 240:

$$\hat{u} = h(U, U^P). \qquad \text{(Eqn. 11)}$$

In one or more implementations, the combined control signal 240 may be provided to the predictor as the training signal. The training signal may be utilized by the predictor learning process in order to generate the predicted output 248 (e.g., as described with respect to FIG. 2A, supra).

In some implementations, a complex teaching signal may be decomposed into multiple components that may drive adaptation of multiple predictor blocks (associated with individual output channels). Prediction of a (given) teaching signal 234 may be spread over multiple predictor output channels 248. Once adapted, outputs of multiple predictor blocks 232 may be combined thereby providing prediction of the teaching signal (e.g., 234 in FIG. 2B). Such an implementation may increase the number of teaching signals that can be mediated using a finite set of control signal channels. Mapping between the control signal 238, the predictor output 248, the combiner output 240, and the teaching signal 234 may comprise various signal mapping schemes. In some implementations, mapping schemes may include one to many, many to one, some to some, many to some, and/or other schemes.

In spiking neuron networks implementations, inputs (e.g., 238, 248 of FIG. 2B) into the combiner 242 may comprise signals encoded using spike latency and/or spike rate. In some implementations, inputs into the combiner may be encoded using one encoding mechanism (e.g., rate). In one or more implementations, inputs into the combiner may be encoded using single two (or more) encoding mechanisms (e.g., rate, latency, and/or other).

The use of multiple input signals (238 1, 238_2 in FIG. 2B) and/or multiple predictor output channels (e.g., 248 1, 248_2 in FIG. 2B) to communicate a single control signal 240 (e.g., control signal U and/or predicted control signal $U^P$) may enable more robust data transmission when compared to a single channel per signal data transmission schemes. Multichannel data transmission may be advantageous in the presence of background noise and/or interference on one or more channels. In some implementations, wherein individual channels are characterized by bandwidth that may be lower than the data rate requirements for the transmitted signal (e.g., control signal U and/or predicted control signal $U^P$) multichannel data transmission may be utilized to de-multiplex the higher data rate signal onto two or more lower capacity communications channels (e.g., 248 1, 248_2 in FIG. 2B). In some implementations, the output encoding type may match the input encoding type (e.g., latency in-latency out). In some implementations, the output encoding type may differ from the input encoding type (e.g., latency in-rate out).

Combiner 242 operation, comprising input decoding-output encoding methodology, may be based on an implicit output determination. In some implementations, the implicit output determination may comprise, determining one or more input values using latency and/or rate input conversion into e.g., floating point and/or integer; updating neuron dynamic process based on the one or more input values; and encoding neuron output into rate or latency. In one or more implementations, the neuron process may comprise a deterministic realization (e.g., Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, now U.S. Pat. No. 9,367, 798, incorporated supra; and/or a stochastic process such as described, for example, in co-owned U.S. patent application Ser. No. 13/487,533, entitled "SYSTEMS AND APPARATUS FOR IMPLEMENTING TASK-SPECIFIC LEARNING USING SPIKING NEURONS", now U.S. Pat. No. 9,146,546, incorporated supra.

In some implementations, combiner operation, comprising input decoding-output encoding methodology, may be based on an explicit output determination, such as, for example, expressed by Eqn. 4-Eqn. 9, Eqn. 14.

Figure 2C:
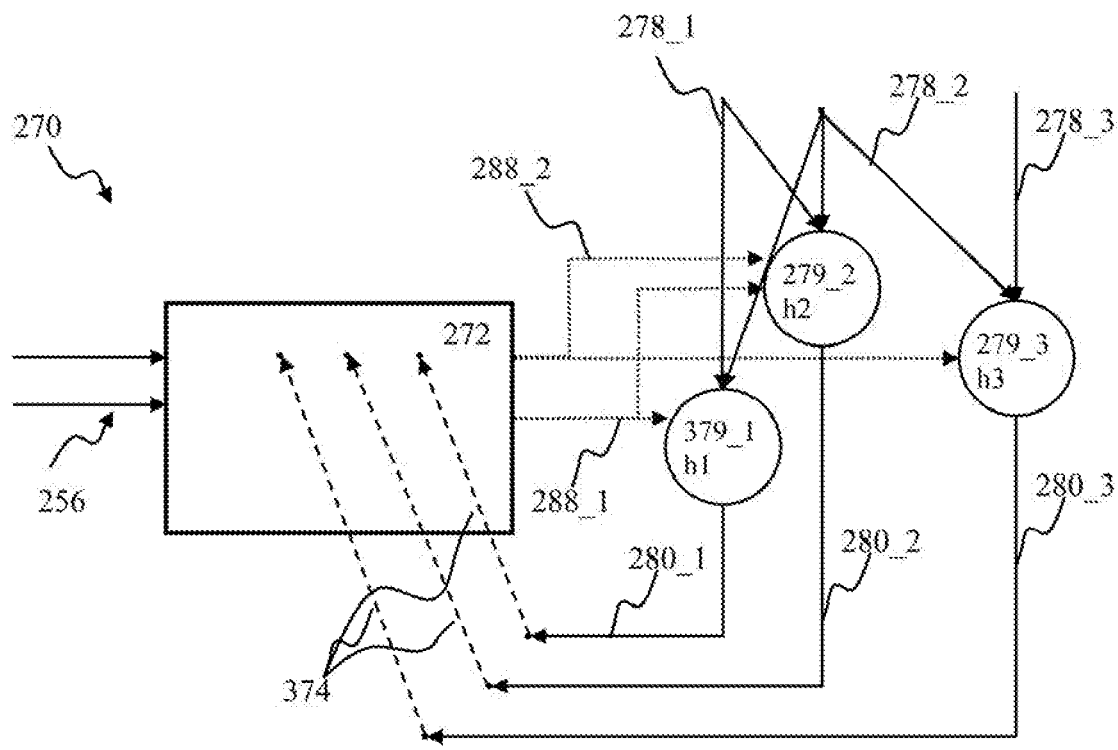
FIG. 2C is a block diagram illustrating a multiplexing adaptive predictor configured to interface to a plurality of combiner apparatus, according to one or more implementations.

In one or more implementations, a predictor may be configured to predict multiple teaching signals, as illustrated in FIG. 2C. The adaptive controller system 270 of FIG. 2C may be utilized responsive to information capacity of the predictor output channel (e.g., how much information may be encoded onto a single channel) is higher than information capacity of teaching signal. In some implementations, a combination of the above approaches (e.g., comprising two or more teaching signals and two or more predictor output channels) may be employed.

The adaptive controller system 270 may comprise a multiplexing predictor 272 and two or more combiner apparatus 279. Controller input U may be de-multiplexed into two (e.g., input 278_1 into combiners 279 1, 279_2) and/or more (input 278_2 into combiners 279 1, 279 2, 279_3). Individual combiner apparatus 279 may be configured to multiplex one (or more) controller inputs 278 and two or more predictor outputs $U^P$ 288 to form a combined signal 280. In some implementations, the predictor output for a given combiner may be spread (de-multiplexed) over multiple prediction channels (e.g., 288 1, 288_2 for combiner 279_2). In one or more implementations, teaching input to a predictor may be delivered via multiple teaching signal 274 associated with two or more combiners.

The predictor 272 may operate in accordance with a learning process configured to determine an input-output transformation such that the output of the predictor $U^P$ after learning is configured to match the output of the combiner $h(U, U^P)$ prior to learning (e.g., when $U^P$ comprises a null signal).

Predictor transformation F may be expressed as follows:

$$U_P = F(\hat{U}), \hat{U} = h(U^P). \quad \text{(Eqn. 12)}$$

In some implementations, wherein dimensionality of control signal U matches dimensionality of predictor output $U^P$, the transformation of Eqn. 12 may be expressed in matrix form as:

$$U^P = F\hat{U}, \hat{U} = HU^P, F = \text{inv}(H). \quad \text{(Eqn. 13)}$$

where H may denote the combiner transfer matrix composed of transfer vectors for individual combiners 279 H=[h1, h2, ..., hn], $\hat{U}$=[û1, û2, ... ûn] may denote output matrix composed of output vectors 280 of individual combiners; and F may denote the predictor transform matrix. The combiner output 280 may be provided to the predictor 272 and/or another predictor apparatus as teaching signal 274 in FIG. 2D. In some implementations, (e.g., shown in FIG. 2B), the combiner output 280 may be provided to the predictor 272 as sensory input signal (not shown in FIG. 2C).

In some implementations of multi-channel predictor (e.g., 232, 272) and/or combiner (e.g., 242, 279) various signal mapping relationships may be utilized such as, for example, one to many, many to one, some to some, many to some, and/or other relationships (e.g., one to one).

In some implementations, prediction of an individual teaching signal (e.g., 234 in FIG. 2B) may be spread over multiple prediction channels (e.g., 248 in FIG. 2B). In one or more implementations, an individual predictor output channel (e.g., 288_2 in FIG. 2C) may contain prediction of multiple teaching signals (e.g., two or more channels 274 in FIG. 2C).

Transfer function h (and or transfer matrix H) of the combiner (e.g., 242, 279 in FIGS. 2B-2C) may be configured to perform a state space transformation of the control signal (e.g., 38, 238 in FIGS. 2B-2C) and/or predicted signal (e.g., 248, 288 in FIGS. 2B-2C). In one or more implementations, the transformation may comprise one or more of a time-domain to frequency domain transformations (e.g., Fourier transform, discrete Fourier transform, discrete cosine transform, wavelet and/or other transformations), frequency domain to time domain transformations (e.g., inverse Fourier transform, inverse discrete Fourier transform, inverse discrete cosine transform, and/or other transformations), wavenumber transform, and/or other transformations. The state space transformation may comprise an application of a function to one (or both) input parameters (e.g., u, $u^P$) into the combiner. In some implementations, the function may be selected from an exponential function, logarithm function, a Heaviside step function, and/or other functions.

In implementations where the combiner is configured to perform the state-space transform (e.g., time-space to frequency space), the predictor may be configured to learn an inverse of that transform (e.g., frequency-space to time-space). Such predictor may be capable of learning to transform, for example, frequency-space input a into time-space output $u^P$.

In some implementations, predictor learning process may be configured based on one or more look-up tables (LUT). Table 1 and Table 2 illustrate use of look up tables for learning obstacle avoidance behavior (e.g., as described with respect to Table 3-Table 5 and/or FIG. 7, below).

Table 1-Table 2 present exemplary LUT realizations characterizing the relationship between sensory input (e.g., distance to obstacle d) and control signal (e.g., turn angle a relative to current course) obtained by the predictor during training. Columns labeled N in Table 1-Table 2, present use occurrence N (i.e., how many times a given control action has been selected for a given input, e.g., distance). Responsive to the selection of a given control action (e.g., turn of 15°) based on the sensory input (e.g., distance from an obstacle of 0.7 m), the counter N for that action may be incremented. In some implementations of learning comprising opposing control actions (e.g., right and left turns shown by rows 3-4 in Table 2), responsive to the selection of one action (e.g., turn of +15°) during learning, the counter N for that action may be incremented while the counter for the opposing action may be decremented.

As seen from the example shown in Table 1, as a function of the distance to obstacle falling to a given level (e.g., 0.7 m), the controller may produce a turn command. A 15° turn is most frequently selected during training for distance to obstacle of 0.7 m. In some implementations, predictor may be configured to store the LUT (e.g., Table 1) data for use during subsequent operation. During operation, the most frequently used response (e.g., turn of 15°) may be output for a given sensory input, in one or more implementations, In some implementations, the predictor may output an average of stored responses (e.g., an average of rows 3-5 in Table 1).

TABLE 1

| d | α° | N |
|---|---|---|
| 0.9 | 0 | 10 |
| 0.8 | 0 | 10 |
| 0.7 | 15 | 12 |
| 0.7 | 10 | 4 |
| 0.7 | 5 | 1 |
| ... | | |
| 0.5 | 45 | 3 |

TABLE 2

| d | α° | N |
|---|---|---|
| 0.9 | 0 | 10 |
| 0.8 | 0 | 10 |
| 0.7 | 15 | 12 |
| 0.7 | −15 | 4 |
| ... | | |
| 0.5 | 45 | 3 |

Figure 3A:
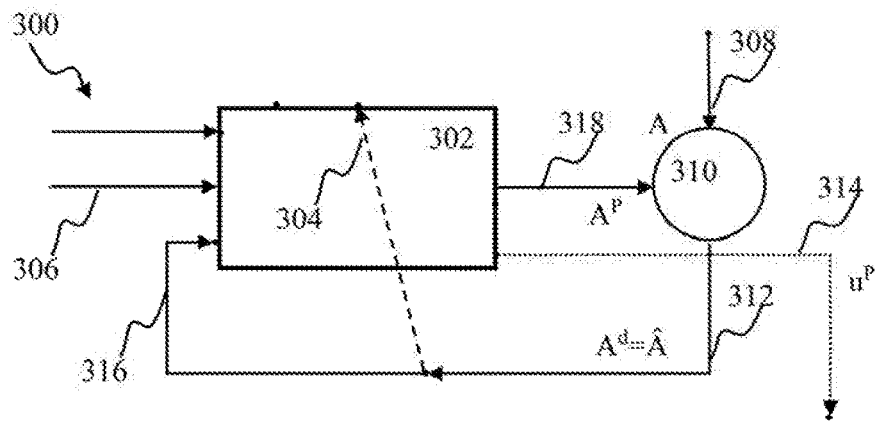
FIG. 3A is a block diagram illustrating an adaptive predictor configured to develop an association between control action and sensory context, according to one or more implementations.

FIG. 3A illustrates an adaptive predictor configured to develop an association between a control action and sensory context, according to one or more implementations. The control system 300 of FIG. 3A may comprise an adaptive predictor 302 and a combiner 310. The combiner 310 may receive an action indication (that also may be referred to as an action tag) 308 from a control entity (e.g., the apparatus 342 of FIG. 3B and/or 212 of FIG. 2A).

Figure 3B:
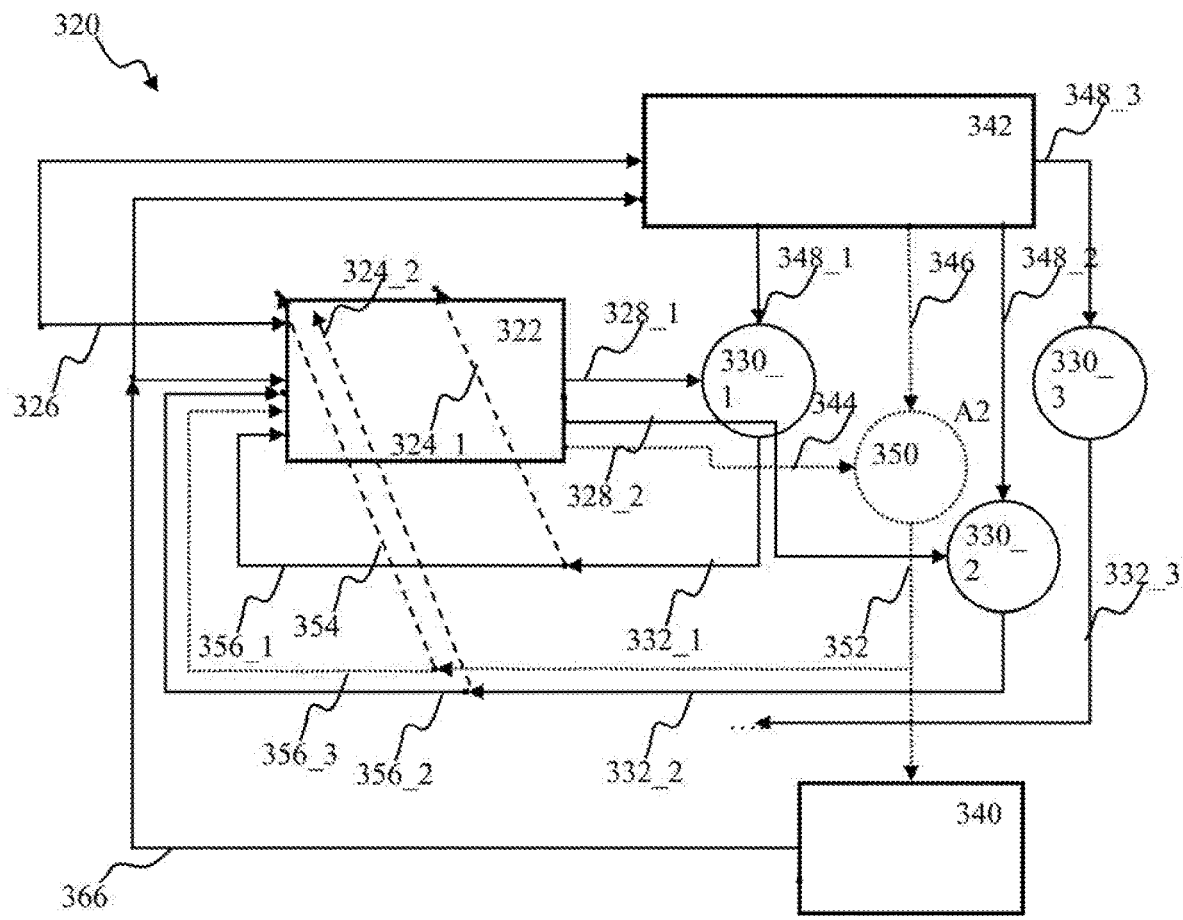
FIG. 3B is a block diagram illustrating a control system comprising an adaptive predictor configured to generate a control signal based on an association between control action and sensory context, according to one or more implementations.

In some implementations of a control system, such as described with respect to FIGS. 3A-3B, the controller (e.g., 342 in FIG. 3B) may be configured to issue a higher level control directive, e.g., the action indication 308, 348, in FIGS. 3A-3B that are not directly communicated to the plant (340) but rather are directed to the predictor (e.g., 302, 322 in FIGS. 3A-3B). As used herein the term "action indication" may be used to refer to a higher level instruction transmitted to and/or emitted by the controller that is not directly communicated to the plant. In one or more implementations, the action indication may comprise, for example, a directive 'turn', 'move ahead'. In some implementations, the control system may utilize a hierarchy of action indications, ranging from less complex/more specific (e.g., turn, move) to more abstract: approach, avoid, fetch, park, grab, and/or other instructions.

Figure 5:
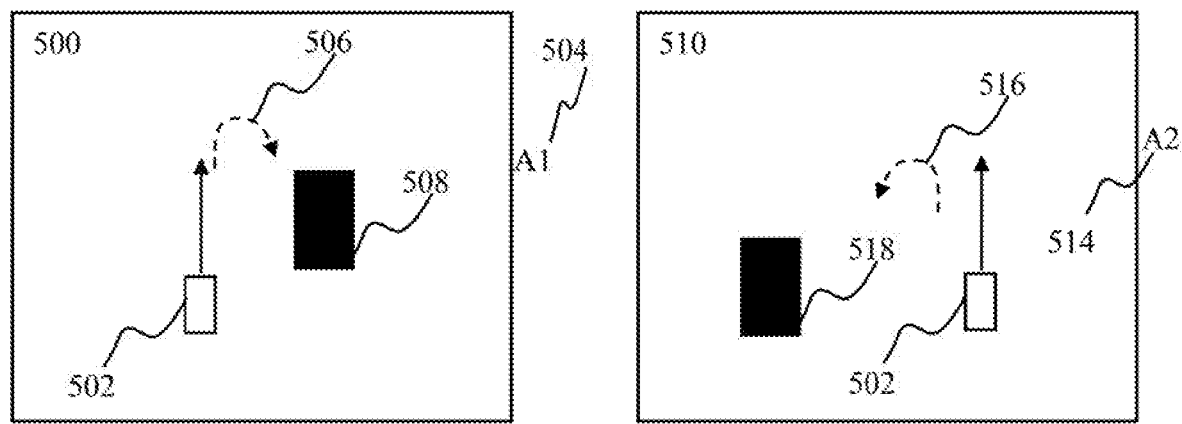
FIG. 5 is a graphical illustration operation of a robotic controller, comprising an adaptive predictor of, e.g., FIGS. 2C, 3A-3B configured to develop an association between control action and sensory context, according to one or more implementations.

Action indications (e.g., 308, 348 in FIGS. 3A-3B) may be configured based on sensory context (e.g., the sensory input 306, 326 in FIGS. 3A-3B). In one or more implementations, the context may correspond to presence of an object (e.g., a target and/or an obstacle), parameters (e.g., relative location), and/or internal state of the robotic device (e.g., a memory trace of a prior action indication) as illustrated in FIG. 5. Panels 500, 510 in FIG. 5 illustrate position of a robotic device 502, comprising for example, a control system (e.g., 300, 320 of FIGS. 3A-3B). The control system may comprise a controller and a predictor. The device 502 may be configured to approach a target 508, 518. The controller of the device 502 may provide an action indication A1 504, A2 514 that may be configured in accordance with the sensory context, e.g., the location of the object 508, 518 with respect to the device 502. By way of a non-limiting example, responsive to the object 508 being to the right of the device 502 trajectory (as shown in the panel 500), the action indication A1 504 may indicate an instruction "turn right". Responsive to the object 508 being to the left of the device 502 trajectory (as shown in the panel 510), the action indication A2 514 may indicate an instruction "turn left". Responsive to the sensory context and the instruction 504, the predictor of the device control system may generate low level motor commands (e.g., depicted by broken arrows 506, 516 in FIG. 5) to execute the respective 90° turns to right/left.

Returning now to FIG. 3A, the control system 300 may comprise the combiner 312 configured to receive the controller action indication A 308 and predicted action indication 318. In some implementations, the combiner 312 may be operable in accordance with any applicable methodologies, e.g., described with respect to FIGS. 2A-3C, above.

The predictor 302 may be configured to generate the predicted action indication $A^P$ 318 based on the sensory context 306 and/or training signal 304. In some implementations, the training signal 304 may comprise the combined output $\hat{A}$.

In one or more implementations, generation of the predicted action indication 318 may be based on the combined signal $\hat{A}$ being provided as a part of the sensory input (316) to the predictor. In some implementations comprising the feedback loop 318, 312, 316 in FIG. 3A, the predictor output 318 may be combined with the controller action indication 308. The combiner 310 output signal 312 may be used as an input 316 to the predictor. Predictor realizations, comprising action indication feedback connectivity, may be employed in applications, wherein (i) the action indication may comprise a sequence of timed actions (e.g., hitting a stationary target (e.g., a nail) with a hammer by a robotic arm); (ii) the predictor learning process may be sensory driven (e.g., by the sensory input 306) in absence of plant feedback (e.g., 336 in FIG. 3B); and (iii) the plant may be characterized by a plant state time parameter that may be greater than the rate of action updates (e.g., the sequence of timed actions 308). It may be advantageous for the predictor 302 to account for a prior action within the sequence (e.g., via the feedback input 316) so as to take into account the effect of its previous state and/or previous predictions in order to make a new prediction. Such methodology may be of use in predicting a sequence of actions/behaviors at time scales where the previous actions and/or behavior may affect the next actions/behavior, e.g., when a robotic manipulator arm may be tasked to fill with coffee three cups one a tray: completion of the first action (filling one cup) may leave the plant (arm) closes to another cup rather than the starting location (e.g., coffee machine). The use of feedback may reduce coffee serving time by enabling the arm to move from one cup to another without returning to the coffee machine in between. In some implementations (not shown), action feedback (e.g., 316 in FIG. 3A) may be provided to other predictors configured to predict control input for other tasks (e.g., filling the coffee pot with water, and/or placing the pot into the coffee maker).

In some implementations, generation of the predicted action indication $A^P$ by the predictor 302 may be effectuated using any of the applicable methodologies described above (e.g., with respect to FIGS. 2A-3C). The predictor may utilize a learning process based on the teaching signal 304 in order to associate action indication A with the sensory input 306 and/or 316.

The predictor 302 may be further configured to generate the plant control signal 314 low level control commands/instructions based on the sensory context 306. The predicted control signal 314 may be interfaced to a plant. In some control implementations, such low-level commands may comprise instructions to rotate a right wheel motor by 30°, apply motor current of 100 mA, set motor torque to 10%, reduce lens diaphragm setting by 2, and/or other commands. The low-level commands may be configured in accordance with a specific implementation of the plant, e.g., number of wheels, motor current draw settings, diaphragm setting range, gear ration range, and/or other parameters.

In some implementations of target approach, such as illustrated in FIG. 5, a predictor may be configured to learn different behaviors (e.g., generate different motor output commands) based on the received sensory context. Responsive to: (i) a target appearing on right/left (with respect to the robotic plant); and (ii) 'turn' action indication the predictor may learn to associate a turn towards the target (e.g., right/left turn 506, 516 in FIG. 5). The actual configuration of the turn commands, e.g., rate of turn, timing, turn angle, may be configured by the predictor based on the plant state (platform speed, wheel position, motor torque) and/or sensory input (e.g., distance to target, target size) independent of the controller.

Responsive to the 'turn' command arriving to the predictor proximate in time to the sensory context indicative of a target, the predictor may generate right/left turn control signal in the presence of the sensory context. Time proximity may be configured based on a particular application parameters (e.g., robot speed, terrain, object/obstacle size, location distance, and/or other parameters). In some applications (e.g., of a garbage collecting robot), the turn command may be time locked (to within +10 ms) from the sensory context indicative of a need to turn (for example toward a target). In some realizations, a target appearing to the right of the robot in absence of obstacles may trigger the action 'turn right'.

During learning predictor may associate movement towards the target (behavior) with the action indication. Subsequently during operation, the predictor may execute the behavior (e.g., turn toward the target) based on a receipt of the action indication (e.g., the 'turn' instruction). In one or more implementations, the predictor may be configured to not generate control signal (e.g., 314 in FIG. 3A) in absence of the action indication (e.g., 308 and/or 304). In other words, the predictor may learn to execute the expected (learned) behavior responsive to the presence of the action indication (informing what action to perform, e.g., turn) and the sensory input (informing the predictor where to turn).

Such associations between the sensory input and the action indicator may form a plurality of composite motor primitive comprising an action indication (e.g., A=turn) and actual control instructions to the plant that may be configured in accordance with the plant state and sensory input.

In some implementations, the predictor may be configured to learn the action indication (e.g., the signal 308 in FIG. 3B) based on the prior associations between the sensory input and the action indication. The predictor may utilize learning history corresponding to a sensory state (e.g., sensory state x1 described with respect to Table 5) and the occurrence of the action indication contemporaneous to the sensory context x1. By way of illustration, based on two or more occurrences (prior to time t1) of the tag A='turn' temporally proximate to a target object (e.g., 508, 518 in FIG. 5) being present to one side from the robotic device 502, the predictor may (at time t1) generate the tag (e.g., signal 318) in absence of the tag input 308.

Based on learning of associations between action indication-control command; and/or learning to generate action indication s, the predictor may be able to learn higher-order control composites, such as, for example, 'approach', 'fetch', 'avoid', and/or other actions, that may be associated with the sensory input.

FIG. 3B is a block diagram illustrating an control system comprising an adaptive predictor configured to generate control signal based on an association between control action and sensory context, according to one or more implementations.

The control system 320 may comprise controller 342, predictor 322, plant 340, and one or more combiners 330, 350. The controller 342 may be configured to generate action indication A 348 based on sensory input 326 and/or plant feedback 336. The controller 342 may be further configured to generate one or more low-level plant control commands (e.g., 346) based on sensory input 326 and/or plant feedback 336. In some control implementations, the low-level commands 346 may comprise instructions to rotate a right wheel motor by 30°, apply motor current of 100 mA, set motor torque to 10%, reduce lens diaphragm setting by 2, and/or other commands. The low-level commands may be configured in accordance with a specific implementation of the plant, e.g., number of wheels, motor current draw settings, diaphragm setting range, gear ration range, and/or other parameters.

One or more of the combiners of the control system of FIG. 3B (e.g., 330_1) may be configured to combine an action indication (e.g., tag A) 348_1, provided by the controller, and the predicted action indication $A^P$ from the predictor to produce a target action indication $\hat{A}$ 332_1.

One or more of the combiners (e.g., 350) may be configured to combine a control command 346, provided by the controller, and the predicted control instructions $u^P$ 344, provided by the predictor, to produce plant control instructions $\hat{u}=h(u,u^P)$ (e.g., 352).

The predictor 322 may be configured to perform prediction of (i) one or more action indications 348; and/or plant control signal $u^P$ 352 that may be associated with the sensory input 326 and/or plant feedback 336. The predictor 322 operation may be configured based on two or more training signals 324, 354 that may be associated with the action indication prediction and control command prediction, respectively. In one or more implementations, the training signals 324, 354 at time t2 may comprise outputs of the respective combiners 330, 350 at a prior time (e.g., t1=t2−dt), as described above with respect to Eqn. 7.

The predictor 322 may be operable in accordance with a learning process configured to enable the predictor to develop associations between the action indication input (e.g., 348_1) and the lower-level control signal (e.g., 352). In some implementations, during learning, this association development may be aided by plant control instructions (e.g., 346) that may be issued by the controller 342. One (or both) of the combined action indication signal (e.g., 332_1) and/or the combined control signal (e.g., 352) may be utilized as a training input (denoted in FIG. 3B by the arrows 324_1, 354, respectively) by the predictor learning process. Subsequent to learning, once the predictor has associated the action indicator with the sensory context, the low-level control signal (e.g., 346) may be withdrawn by the controller. Accordingly, the control system 320 of FIG. 3B may take configuration of the control system 300 shown in FIG. 3A.

In some implementations, the combined action indication signal (e.g., 332) and/or the combined control signal (e.g., 352) may be provided to the predictor as a portion of the sensory input, denoted by the arrows 356 in FIG. 3B.

In one or more implementations, two or more action indications (e.g., 348_1, 348_2_ may be associated with the control signal 352. By way of a non-limiting example, illustrated for example in FIG. 4, the controller apparatus 320 of FIG. 3B may be configured to operate a robotic platform. Action indication 348_1 may comprise a higher level control tag 'turn right'; the action indication 348_2 may comprise a higher level control tag 'turn left'. Responsive to receipt of sensory input 356, 326 and/or teaching input 324, 354 the predictor 322 may learn to associate, for example, 'turn right' action indication with a series of motor instructions (e.g., left wheel rotate forward right, right wheel rotate backwards) with one (or more) features (e.g., object type and location) that may be present within the sensory input. Such association s may be referred to as a composite task (e.g., comprising tag and a motor output).

Upon learning these composite tasks, the predictor 322 may be provided with a higher level action indication (e.g., 348_3). The term 'higher level' may be used to describe an action (e.g., 'approach'/'avoid') that may comprise one or more lower level actions (e.g., 348 1, 348 2, 'turn right'/ 'turn left'). In some implementations, the higher level action indication (e.g., 348_3) may be combined (by, e.g., the combiner 330_3 in FIG. 3B) with a predicted higher level action indication (not shown in FIG. 3B). The combined higher level action indication may be provided to the predictor as a teaching signal and/or sensory input (not shown in FIG. 3B). One or more levels of action indications may form a hierarchy of actions, also referred to as primitives or sub-tasks.

Control action separation between the predictor 302, 322 (configured to produce the plant control signal 314, 352) and the controller 342 (configured to provide the action indication 348) described above, may enable the controller (e.g., 342 in FIG. 3B) to execute multiple control actions (e.g., follow a target while avoiding obstacles) contemporaneously with one another.

Control action separation between the predictor 302, 322 (configured to produce the plant control signal 314, 352) and the controller 342 (configured to provide the action indication 348) described above, may enable the controller (e.g., 342 in FIG. 3B) to execute multiple control actions (e.g., follow a target while avoiding obstacles) contemporaneously with one another.

The controller 342 may be operable in accordance with a reinforcement learning (RL) process. In some implementations, the RL process may comprise a focused exploration methodology, described for example, in co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra.

The predictor 322 may be operable in accordance with a supervised learning (SL) process. In some implementations, the supervised learning process may be configured to cause output that is consistent with the teaching signal. Output consistency may be determined based on one or more similarity measures, such as correlation, in one or more implementations.

Reinforcement learning process of the controller may rely on one or more exploration techniques. In some implementations, such exploration may cause control signal corresponding one or more local minima of the controller dynamic state. Accordingly, small changes in the controller input (e.g., sensory input 326 in FIG. 3B) may cause substantial changes in the control signal responsive to a convergence of the controller state to another local minimum. Exploration of reinforcement learning may require coverage of a full state space associated with the controller learning process (e.g., full range of heading, tilt, elevation for a drone searching for a landing strip). State exploration by reinforcement learning may be time consuming and/or may require more substantial computational and/or memory resources when compared to supervised learning (for the same spatial and temporal resolution). Training signal used by supervised learning may limit exploration by pointing to a region within the state space where the target solution may reside (e.g., a laser pointer used for illuminating a potential target). In some implementations, the supervised learning may be faster (e.g., converge to target solution with a target precision in shorter amount of time) compared to reinforcement learning. The use of target signal during training may enable the SL process to produce a more robust (less varying) control signal for a given set of sensory input, compared to the RL control signal. For a given size/capability of a software/hardware controller platform, reinforcement learning may perform fewer tasks (a single task in some implementations) compared to supervised learning that may enable the controller platform to execute several (e.g., 2-10 in some implementations). In one or more implementations, reinforcement learning signal may be provided by human operator.

Figure 4:
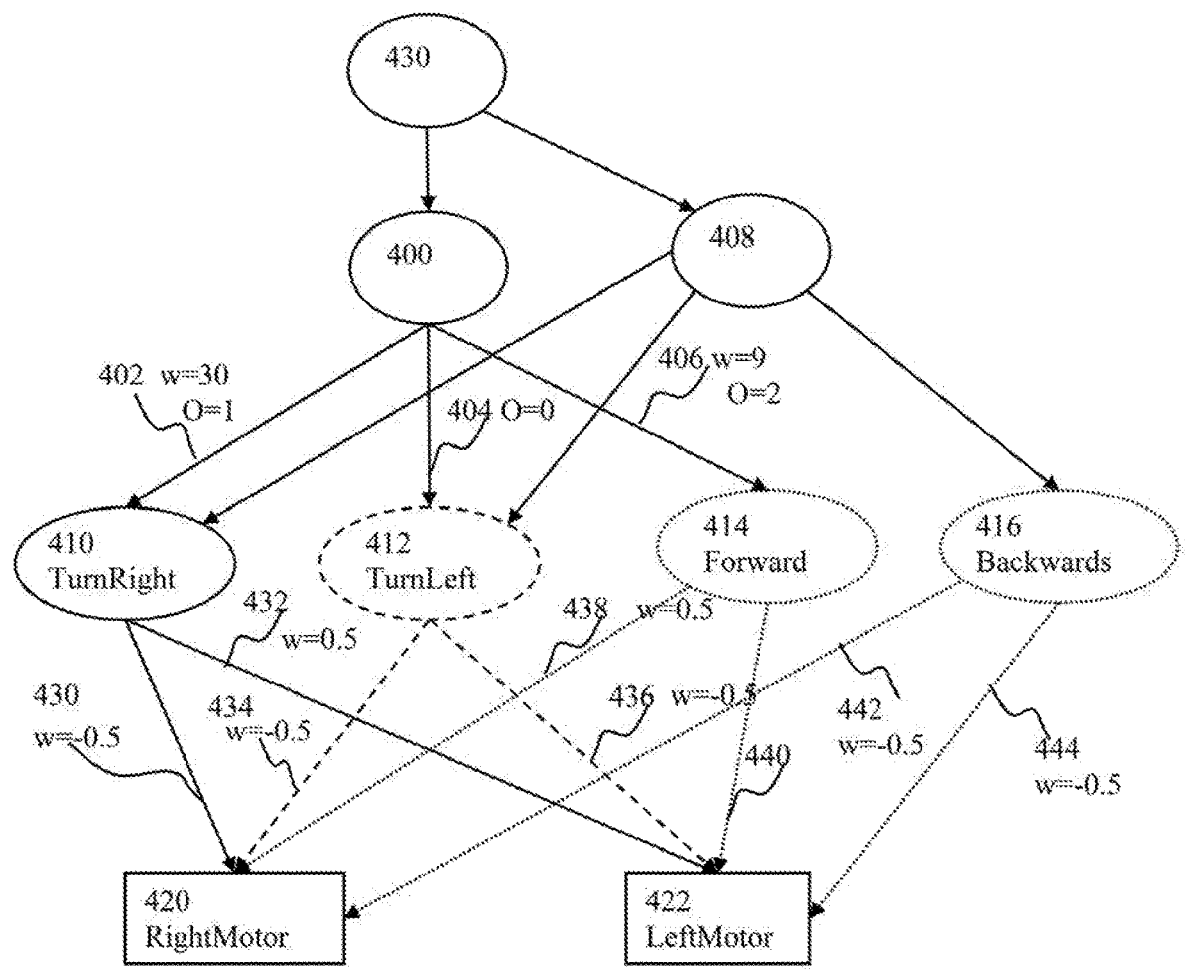
FIG. 4 is a graphical illustration depicting a hierarchy of control actions for use with an adaptive control system of e.g., FIGS. 3A-3B, according to one or more implementations.

FIG. 4 illustrates one example of a hierarchy of actions for use with, for example, controller of FIG. 3B. An action indication 400 may correspond to a higher level composite action, e.g., 'approach', 'avoid', 'fetch', and/or other. The composite action indication 400 may be configured to trigger execution of or more actions 410, 412, 414 (also referred to as sub-tasks). The sub-tasks 410, 412, 414 may correspond to lower level (in the hierarchy of FIG. 4) actions, such as 'turn right', 'turn left', 'go forward', respectively.

The sub-tasks (e.g., 410, 412, 414 in FIG. 4) may be associated with one (or more) control signal instructions, e.g., signal 352 described with respect to FIG. 3B, supra. Individual second level sub-tasks (e.g., 410, 412, 414 in FIG. 4) may be configured to invoke one or more lower (e.g., third in FIG. 4) level sub-tasks. 420, 422 may correspond to instructions configured to activate right/left motors of the robotic platform. In some implementations, subtasks that may be invoked by one or more higher level tasks and that may be configured to generate motor control instructions may be referred to as the motor primitives (e.g., 420, 422 in FIG. 4).

Subtasks of a given level (e.g., 400, 408 and/or 410, 412, 414 in FIG. 4) may comprise one or more activation parameters associated with lower level subtasks (e.g., 410, 412, 414, and/or 420, 422 respectively in FIG. 4). The parameters (e.g., 402, 404, 406) may comprise one or more of, execution order, weight, turn angle, motion duration, rate of change, torque setting, drive current, shutter speed, aperture setting, and/or other parameters consistent with the plant hardware and/or software configuration.

As illustrated in FIG. 4, the task 400 (e.g., approach target) may comprise a 30° right turn followed by a 9 second forward motion. The parameters 402, 404, 406 may be configured as follows:

O=1, w=30;
O=0; and
O=2, w=9; respectively.

The task 408 may correspond to avoid target and may invoke right/left turn and/or backwards motion tasks 410, 412, 416, respectively.

Individual tasks of the second level (e.g., 410, 412, 414, 416 in FIG. 4) may cause execution of one or more third level tasks (420, 422). The parameters 430, 432, 434, 436, 438, 440 may be configured as follows:

to execute right turn: rotate forward left motor with torque of 0.5; (w=0.5), rotate right motor backwards with torque of 0.5; (w=−0.5);

to execute left turn: rotate right motor backwards with torque of 0.5; (w=−0.5), rotate forward right motor with torque of 0.5; (w=0.5);

to move forward: rotate forward left motor with torque of 0.5; (w=0.5), rotate forward right motor with torque of 0.5; (w=0.5); and to move backwards: rotate left motor backwards with torque of 0.5; (w=−0.5), rotate right motor backwards with torque of 0.5; (w=−0.5).

The hierarchy illustrated in FIG. 4, may comprise another level (e.g., 430) that may be configured to implement pursue functionality. In one or more implementations, the pursue functionality may trigger target approach task 400 and/or obstacle avoidance task 408.

In one or more implementations wherein the predictor comprises a spiking neuron network, learning a given behavior (e.g., obstacle avoidance and/or target approach) may be effectuated by storing an array of efficacies of connections within the predictor network. In some implementations, the efficacies may comprise connection weights, adjusted during learning using any applicable methodologies. In some implementations, connection plasticity (e.g., efficacy adjustment) may be implemented based on the teaching input as follows:

based on a teaching input (e.g., spike) and absence of neuron output spike connections delivering input spikes into the neuron (active connection) that precede the teaching spike (within a plasticity window), may be potentiated; and/or based on neuron output spike in absence of teaching input, active connections delivering input spikes into the neuron (active connection)) that precede the output spike (within a duration specified by plasticity window), may be depressed.

In some implementations wherein the sensory input may be updated at 40 ms intervals and/or control signal may be updated at a rate of 1-1000 Hz, the duration of the plasticity window may be selected between 1 ms and 1000 ms. Upon learning a behavior, network configuration (e.g., an array of weights) may be stored for future use by the predictor.

Individual network portions may be configured to implement individual adaptive predictor realizations. In some implementations, one network portion may implement an object approach sub-task predictor while another network portion may implement an obstacle avoidance sub-task predictor. Another network portion may implement a task predictor (e.g., a fetch task). In some implementations, predictors implemented by individual network portions may form a hierarchy of predictors. Lower-level predictors may be configured to produce control (e.g., motor) primitives (also referred to as the pre-action and/or pre-motor output). Higher level predictors may provide output comprising predicted obstacle avoidance/target approach instructions (e.g., approach, avoid).

In some implementations of a fetch task (comprising for example target approach and/or obstacle avoidance), the lower level predictors may predict execution of basic actions (so-called, motor primitives), e.g., rotate left with v=0.5 rad/s for t=10 s.

Predictors of a higher level within the hierarchy, may be trained to specify what motor primitive to run and with what parameters (e.g., v, t).

At a higher level of hierarchy, the predictor may be configured to plan a trajectory and/or predict an optimal trajectory for the robot movement for the given context.

At yet another higher level of the hierarchy, a controller may be configured to determine a behavior that is to be executed at a given time, e.g. now to execute the target approach and/or to avoid the obstacle.

In some implementations, a hierarchy actions may be expressed as:
top level=behavior selection;
2nd level=select trajectory;
3rd level=activate motor primitives to execute given trajectory; and
4th level=issue motor commands (e.g. PWM signal for servi motors) to execute the given motor primitives.

In one or more implementations of hierarchy of predictors, lower level predictors may provide inputs to higher level predictors. Such configuration may advantageously alleviate the higher level predictor from performing all of the functionality that may be required in order to implement target approach and/or obstacle avoidance functionality.

The hierarchical predictor configuration described herein may be utilized for teaching a robotic device to perform new task (e.g., behavior B3 comprised of reaching a target (behavior B1) while avoiding obstacles (behavior B2). The hierarchical predictor realization may enable a teacher (e.g., a human and/or computerized operator) to divide the composite behavior B3 into two or more sub-tasks (B1, B2). In one or more implementations, performance of the sub-tasks may be characterized by lower processing requirements by the processing block associated with the respective predictor; and/or may require less time in order to arrive at a target level of performance during training, compared to an implementation wherein all of the behaviors (B1, B2, B3) are learned concurrently with one another. Predictors of lower hierarchy may be trained to perform sub-tasks B1, B2 in a shorter amount of time using fewer computational and/or memory resources, compared to time/resource budget that may be required for training a single predictor to perform behavior B3.

When training a higher hierarchy predictor to perform new task (e.g., B3 acquire a target), the approach described above may enable reuse of the previously learnt task/primitives (B1/B2) and configured the predictor to implement learning of additional aspects that may be associated with the new task B3, such as B3a reaching and/or B3b grasping).

If another behavior is to be added to the trained behavior list (e.g., serving a glass of water), previously learned behavior(s) (e.g., reaching, grasping, and/or others, also referred to as the primitives) may be utilized in order to accelerate learning compared to implementations of the prior art.

Reuse of previously learned behaviors/primitives may enable reduction in memory and/or processing capacity (e.g., number of cores, core clock speed, and/or other parameters), compared to implementations wherein all behaviors are learned concurrently. These advantages may be leveraged to increase processing throughput (for given neuromorphic hardware resources) and/or perform the same processing with a reduced complexity and/or cost hardware platform, compared to the prior art.

Learning of behaviors and/or primitives may comprise determining an input/output transformation (e.g., the function F in Eqn. 10, and/or a matrix F of Eqn. 13) by the predictor. In some implementations, learning a behavior may comprise determining a look-up table and/or an array of weights of a network as described above. Reuse of previously learned behaviors/primitives may comprise restoring/copying stored LUTs and/or weights into predictor realization configured for implementing learned behavior.

Exemplary operation of adaptive controller system (e.g., 200, 230, 270 of FIGS. 2A-2C, respectively) is now described in detail. The predictor and/or the controller of the adaptive controller system may be operated in accordance with an update process configured to be effectuated continuously and/or at discrete time intervals Δt, described above with respect to Eqn. 7.

The control signal (e.g., 208 in FIG. 2A) may be provided at a rate between 1 Hz and 1000 Hz. A time scales $T_{plant}$ describing dynamics of the respective plant (e.g., response time of a rover and/or an aerial drone platform, also referred to as the behavioral time scale) may vary with the plant type and comprise scales on the order of a second (e.g., between 0.1 s to 2 s).

The transfer function of the combiner of the exemplary implementation of the adaptive controller apparatus 200, may be configured as follows:

$$\hat{u} = h(u, u^P) = u + u^P. \quad \text{(Eqn. 14)}$$

Training of the adaptive predictor (e.g., 222 of FIG. 2A) may be effectuated via a plurality of trials. In some implementations, training of a mechanized robot and/or an autonomous rover may comprise between 5 and 50 trials. Individual trials may be configured with duration that may be sufficient to observe behavior of the plant (e.g., execute a turn and/or another maneuver), e.g., between 1 and 10 s.

In some implementations the trial duration may last longer (up to tens of seconds) and be determined based on a difference measure between current performance of the plant (e.g., current distance to an object) and a target performance (e.g., a target distance to the object). The performance may be characterized by a performance function as described in detail in co-owned and co-owned U.S. patent application Ser. No. 13/487,499 entitled "STOCHASTIC APPARATUS AND METHODS FOR IMPLEMENTING GENERALIZED LEARNING RULES", now U.S. Pat. No. 9,104,186, incorporated supra. Individual trials may be separated in time (and in space) by practically any duration commensurate with operational cycle of the plant. By way of illustration, individual trials when training a robot to approach objects and/or avoid obstacles may be separated by a time period and/or space that may be commensurate with the robot traversing from one object/obstacle to the next. In one or more implementations, the robot may comprise a rover platform, and/or a robotic manipulator arm comprising one or more joints.

Figure 6A:
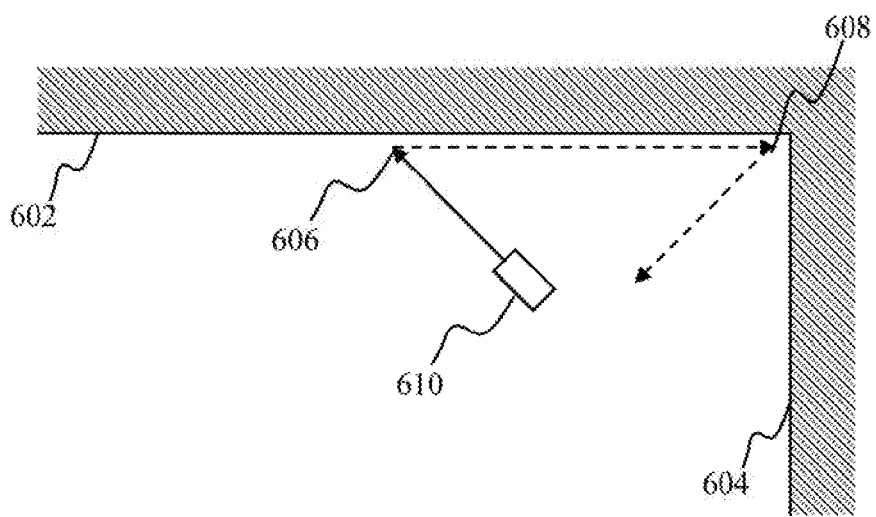
FIG. 6A is a graphical illustration depicting obstacle avoidance training of a robotic device, according to one or more implementations.

FIG. 6A illustrates an exemplary trajectory of a rover configured to learn obstacle avoidance. The rover 610 may be configured to avoid walls 602, 604. In some implementations, the avoidance policy may comprise execution of a 45° turn, e.g., 606, 608 in FIG. 6A. As used herein designators TN may be used to refer to a time of a given trial (e.g., T1 denoting time of first trial). During first trial, at time T1:
the predictor (e.g., 222 of FIGS. 2A-2B) may receive control signal u1 (e.g., turn right 45°) from control entity 212. The control signal may correspond to sensory input x1 (e.g., 206, 216 in FIG. 2A) that may be received by the controller and/or the predictor; such signal may comprise a representation of an obstacle (e.g., a wall), and/or a target (e.g., a charging dock);
the predictor may be configured to generate predicted control signal (e.g., $u1^P = ) 0°$);
the combiner may produce combined output u1'=45°; and the plant 210 may begin to turn right in accordance with the combined output (e.g., 220).

During another trial at time T2>Ti:
the predictor 222 may receive control signal u2 (e.g., still turn right 45°) from the controller 212;
the plant feedback may indicate to the predictor that the plant is executing a turn (in accordance with the prior combined output u1'); accordingly, the predictor may be configured to 'mimic' the prior combined output u1' and to generate predicted control signal (e.g., $u2^P = 10°$);
the combiner may produce new combined output u2'=55°; and
the plant 210 may increase the turn rate in accordance with the updated control signal u2'.

During another trial at time T3>T2:
the input x3 may indicate to the controller 212 that the plant turn rate is in excess of the target turn rate for the 40° turn; the controller 212 may reduce control signal to u3=35°,
based on the input x3, indicative of e.g., the plant turn rate for u2'=55°, the predictor may be configured to increase its prediction to e.g., $u3^P = 20°$; and the combiner (e.g., 210 of FIG. 2A) may receive control signal u3 (e.g., turn right) 35° from the controller 212; the combiner may produce the combined output u3'=55°.

During other trials at times Ti>T3 the predictor output may be increased to the target plant turn of 45° and the control signal 208 may be reduced to zero. In some implementations, the outcome of the above operational sequence may be referred to as (gradual) transfer of the control signal to the predictor output. An instance of the training process described above may be summarized using data shown in Table 1:

TABLE 3

| Trial # | Control signal u [deg] | Predicted signal $u^P$ [deg] | Combined signal $\hat{u}$ [deg] | Error $(\hat{u} - u^P)$ [deg] |
|---|---|---|---|---|
| 1 | 45 | 0 | 45 | 45 |
| 2 | 45 | 10 | 55 | 45 |
| 3 | 35 | 20 | 55 | 35 |
| 4 | 25 | 35 | 60 | 25 |
| 5 | 25 | 50 | 60 | 10 |
| 6 | 0 | 55 | 55 | 0 |
| 7 | 0 | 55 | 55 | 0 |
| 8 | −10 | 55 | 45 | −10 |
| 9 | −10 | 50 | 40 | −10 |
| 10 | 0 | 45 | 45 | 0 |

As seen from Table 3, when the predictor is capable to producing the target output (e.g., trial #10), the control signal (e.g., 208 in FIG. 2A) may be withdrawn (removed). The output of the combiner (e.g., 214) in such realizations may comprise the predictor output in accordance with, for example, Eqn. 14.

In some implementations, the control entity (e.g., 421 in FIG. 2A) may comprise a human trainer of the robot. In one or more implementations, the control entity may comprise an adaptive system operable in accordance with a learning process. In one or more implementations, the learning process of the controller may comprise one or more reinforcement learning, unsupervised learning, supervised learning, and/or a combination thereof, as described in co-owned and co-pending U.S. patent application Ser. No. 13/487,499 entitled "STOCHASTIC APPARATUS AND METHODS FOR IMPLEMENTING GENERALIZED LEARNING RULES", incorporated supra.

In one or more implementations, the training steps outlined above (e.g., trials summarized in Table 3) may occur over two or more trials wherein individual trial extend over behavioral time scales (e.g., one second to tens of seconds).

In some implementations, the training steps may occur over two or more trials wherein individual trials may be characterized by control update scales (e.g., 1 ms to 1000 ms).

In some implementations, the operation of an adaptive predictor (e.g., 222 in FIG. 2A) may be characterized by predictor learning within a given trial as illustrated and described with respect to Table 4.

Figure 6B:
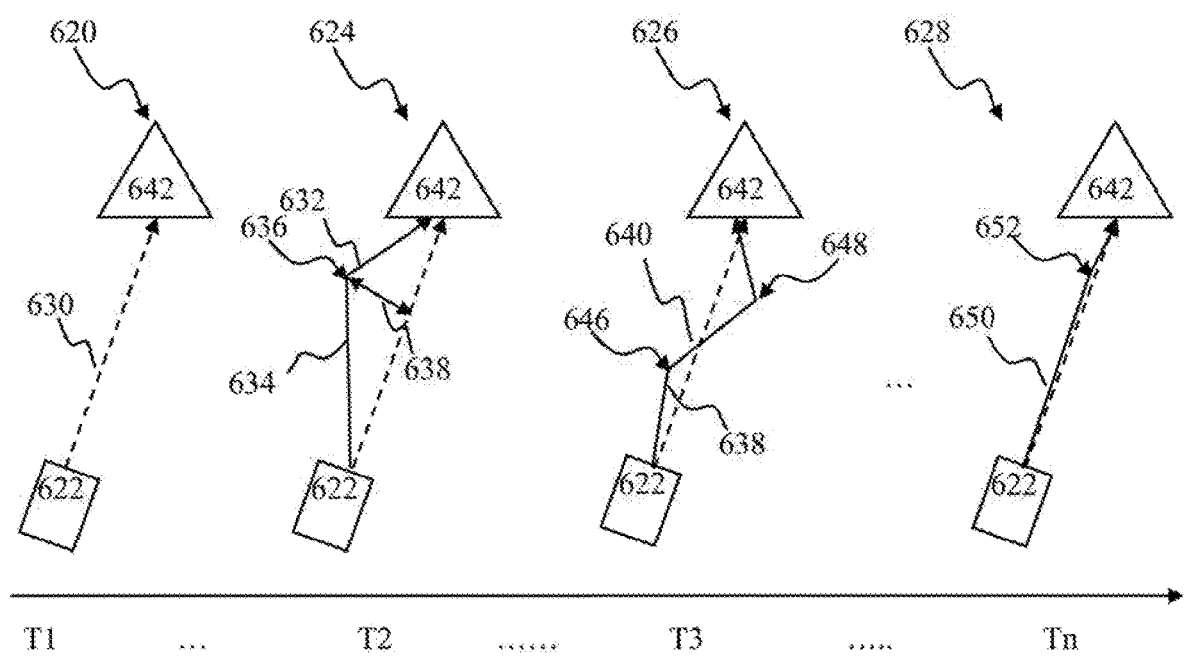
FIG. 6B is a graphical illustration depicting training a robot to perform a target approach task, according to one or more implementations.

FIG. 6B illustrates training of a robotic rover device to approach a target. The robot 622 in FIG. 6B may be configured to approach the target 642 (e.g., a ball, a charging station, and/or other target). Training may comprise a plurality of trials 620, 664, 626, 628 wherein a teacher may train the rover to perform a target approach along a target trajectory (e.g., depicted by broken line arrow 630). As used herein designators TN may be used to refer to a time of a given trial (e.g., T1 denoting time off trial 620). In some implementations, the teacher may comprise a human trainer. The robot may comprise an adaptive controller, e.g., the controller 200 of FIG. 2A. During one or more initial trials (e.g., 630 in FIG. 6B) the teacher may direct the robot 622 along the target trajectory 630. While following the target trajectory, a learning process of the robot controller may learn (e.g., via adaptation of learning parameters) an interrelationship between the sensory input, the controller state, and/or the teaching input. In the realization illustrated in FIG. 6B, the sensory input may comprise data related to robot motion parameters (position, orientation, speed, acceleration and/or other parameters) and/or target information (distance to, color, shape, and/or other information). The teaching input may comprise a motion directive (e.g., joystick forward and/or other directive), motor control commands (e.g., rotate left wheel clockwise and/or other commands) and/or other teaching input. In some implementations, during the teacher-guided trials (e.g., 620), the motor control output (e.g., 220 in FIG. 2A) may be configured solely on the control input from the teacher in accordance with Eqn. 4.

Upon completion of one or more teacher-guided trials, the robot 622 may be configured to perform one or more teacher-assisted trials (e.g., the trials 624, 626, 628 in FIG. 6B). During a teacher-assisted trial the adaptive controller of the robot 622 may be configured to generate a predicted control signal (e.g., 218 in FIG. 2A). The predicted control signal may be combined with the user input using any of the methodologies described herein and/or other methodologies. During the trial 624, the robot may process along trajectory portion 634. In some implementations, the user may withdraw guidance during the traversal of the trajectory portion 634 by the robot so as to assess an ability of the robot to navigate the target trajectory. The trajectory portion 634 may deviate from the target trajectory 630 autonomously. Upon determining that the trajectory deviation (denoted by the arrow 638) exceeds a maximum deviation for the task, the user may assist the controller of the robot by providing user input. In some implementations, the user input may be configured to assist the robot by providing a corrective action (e.g., turn right by 110°, indicted by the arrow 636). In one or more implementations, the user input may be configured to repeat the last action performed by the robot. In yet another implementation, the user input may be configured to increase or decrease the magnitude or temporal extension of an on-going action (e.g., "keep going" or "that's enough"). During individual trials 624, 626, 628 user assistance may be provided at one or more times, as illustrated by arrows 636, 646, 648 in FIG. 6B.

While following a trajectory during trials 624, 626, 628, a learning process of the robot controller may learn (e.g., via adaptation of learning parameters) an interrelationship between the sensory input, the controller state (e.g., predicted control signal), and/or the teaching input.

During successive trials 624, 626, 628 the performance of the robot may improve as determined based on a performance measure. In some implementations, the performance measure may comprise a discrepancy measure between the actual robot trajectory (e.g., 632, 634) and the target trajectory. The discrepancy measure may comprise one or more of maximum deviation, maximum absolute deviation, average absolute deviation, mean absolute deviation, mean difference, root mean squatter error, cumulative deviation, and/or other measures.

Upon completion of one or more teacher-assisted trials (e.g., 624, 628), the robot 622 may be configured to navigate the target trajectory absent user input (not shown in FIG. 6B). The learning by the robot during previous trials may enable navigation of the target trajectory by the robot that is within the training performance margin. It is noteworthy that, during user-assisted training trials, the user and the robot may cooperate with one another (e.g., via the use of the combiners 310, 330 of FIGS. 3A-3B) in order to accomplish target action (e.g., navigate the trajectory 630 of FIG. 6B).

Learning by the adaptive controller apparatus (e.g., 200 FIG. 2) may enable transfer of information (knowledge') from the user (e.g., control signal e.g., 208 in FIG. 2A) to the robot (e.g., predicted control output (e.g., 218 in FIG. 2A) of the adaptive controller). As used herein the term 'knowledge' may refer to changes to the adaptive controller state needed to reproduce, in its predictions (e.g., 218 in FIG. 2A), the signals previously produced by the control signal (e.g., 208 in FIG. 2A), but in the absence of continued control signal.

It is noteworthy that, in accordance with the principles of the present disclosure, the information transfer (such as described with respect to FIG. 6B) may occur not instantaneously but gradually on time scales that are in excess of the robot adaptive controller update intervals. Initially (e.g., at time Ti in FIG. 6A), the user may be capable of controlling the robot in accordance with the target trajectory. Subsequently (e.g., at time T>Tn in FIG. 6B), the adaptive controller may be capable of controlling the robot in accordance with the target trajectory. There may exist an intermediate state (e.g., T2, T3, Tn in FIG. 6B) wherein: (i) both the adaptive controller and the user are attempting to operate the robot in accordance with the target trajectory (e.g., the user provides the control signal 208, the adaptive controller generates the predicted control signal 218; (ii) the combined output (e.g., 220) is inadequate (either too large or too small) to achieve the target trajectory within the performance bounds; and/or other states.

The intermediate stare state may be characterized by control of the robot effectuated via collaboration between the user and the adaptive controller. At a given training trial (e.g., 620, 626, 624, 628) control process of the robot may be configured based on contributions by the user and the adaptive controller. Transition from the initial trial (e.g., 620) wherein the adaptive controller contribution may be zero and/or altogether absent, to the final trial (e.g., 628) wherein the user contribution may be zero and/or absent may occur gradually and/or absent (e.g., a 'toggle' characterizing 'OR' operation). Upon termination of the training, the robot may be configured to execute the target task autonomously (e.g., approach the target 642 absent continuing user input) upon detecting in the presence of the training context (e.g., representation of the target 642) in its sensory input. In some implementations, the adaptive controller may be configured to generate the predicted signal $u^P$ such that it closely reproduces the initial control signal u. This is shown in Table 3, where predicted signal at trial 10 matches the initial control signal at trial 1.

In one or more implementations, such as described in owned U.S. patent application Ser. No. 13/842,530 entitled "ADAPTIVE PREDICTOR APPARATUS AND METHODS", filed Mar. 15, 2013, the adaptive controller may be configured to predict cumulative (e.g., integrated over the trial duration) outcome of the control action.

FIGS. 7A-7G depict various user input waveforms useful for training of robotic devices during trials, such as show and described with respect to FIGS. 6A-6B, above.

Figure 7A:
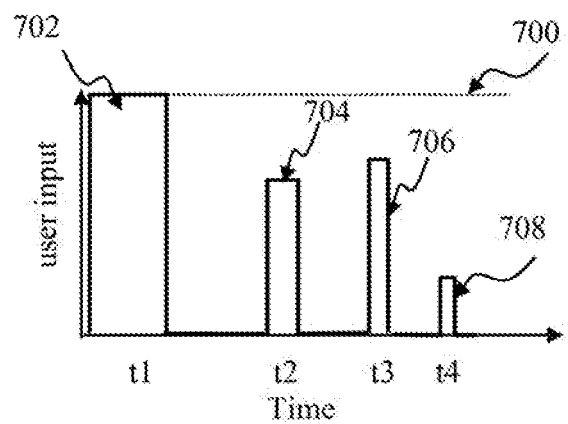
FIG. 7A is a plot depicting modulated user input provided to a robotic device during one or more training trials for use, for example, with the target approach training of FIG. 6B, according to one or more implementations.

FIG. 7A depicts modulated user input provided to a robotic device during one or more training trials for use, for example, with the target approach training of FIG. 6B, according to one or more implementations. The user input of FIG. 7A may comprise a plurality of user inputs (e.g., pulses 702, 704, 706, 708) at times t1, t2, t3, t4, t5. The signal modulation of FIG. 7A may comprise one or more of: a pulse width modulation (e.g., pulses 702, 706) having different duration; a pulse amplitude modulation (e.g., pulses 702, 706) having different amplitude; and/or a pulse position modulation (e.g., pulses 702, 704 and 706, 708) occurring at different intervals. In one or more implementations, individual pulses 702, 704, 706, 708 may correspond to user input during respective training trials (e.g., 624, 626 and other in FIG. 6B). In some implementations, the pulses 702, 704, 706, 708 may correspond to user input during a given training trial (e.g., 624 in FIG. 6B).

By way of non-limiting illustration, the waveforms of FIG. 7A may be utilized as follows: during an initial trial (e.g., 624) the user may provide user input 702 of a sustained duration and full magnitude 700 (e.g., joystick on full forward for 10 second). At a subsequent trial, the user may provide input 704 of a shorter duration and lower magnitude (e.g., turn slightly right, compared to the initial input 702.

Figure 7B:
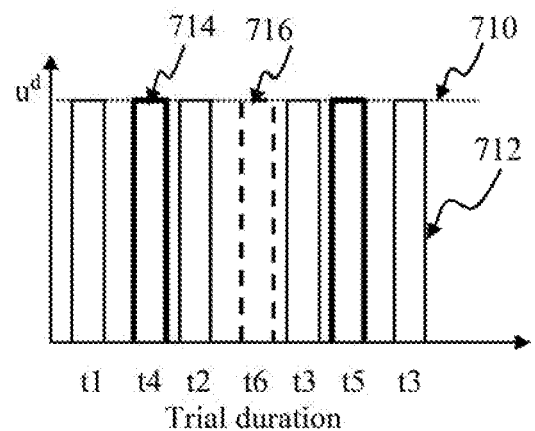
FIG. 7B is a plot depicting pulse frequency modulated user input provided to a robotic device during one or more training trials for use, for example, with the target approach training of FIG. 6B, according to one or more implementations.

FIG. 7B illustrates pulse frequency modulated user input provided to a robotic device during one or more training trials for use, for example, with the target approach training of FIG. 6B, according to one or more implementations. Pulses depicted by lines of different styles may correspond to different trials. By way of non-limiting illustration, the waveforms of FIG. BA may be utilized as follows: at an initial trial (pulses depicted by thin line e.g., 712 in FIG. 7B) user may provide more frequent inputs as compared to inputs during subsequent trials, depicted by thick line pulses (e.g., 714). Individual user inputs in FIG. 7B implementation (e.g., pulses 712, 714, 716) may comprise pulses of fixed amplitude 710 and/or fixed duration.

Figure 7C:
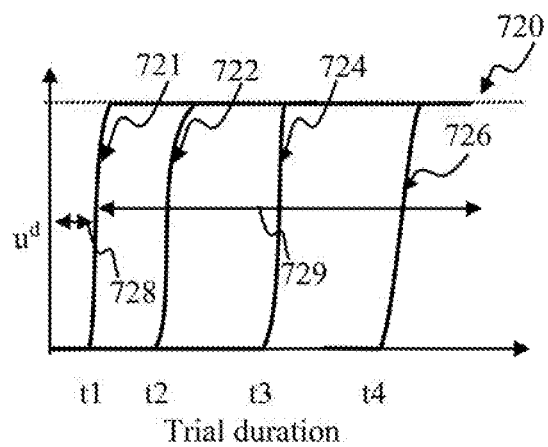
FIG. 7C is a plot depicting ramp-up modulated user input provided to a robotic device during one or more training trials for use, for example, with the target approach training of FIG. 6B, according to one or more implementations.

FIG. 7C illustrates ramp-up modulated user input provided to a robotic device during one or more training trials for use, for example, with the target approach training of FIG. 6B, according to one or more implementations. As used herein, the terms "ramp-up modulated user input" and/or "ramp-down modulated user input" may be used to describe user input characterized by a parameter that may progressively increase and/or decrease, respectively. In one or more implementations, the parameter may comprise input magnitude, frequency, duration, and/or other parameters.

Individual curves 721, 722, 723, 724, 726 may depict user input during individual trials (e.g., 620, 624, 626, in FIG. 6B). By way of a non-limiting illustration, the waveforms of FIG. 7C may be utilized as follows: at an initial trial (shown by the curve 721 in FIG. 7C) the user may let the robotic device to navigate the trajectory without assistance for a period 728. Upon determining a robot's performance, the user may provide control input of amplitude 720 and duration 729. During one or more subsequent trials, the user may delay assistance onset (e.g., increase the time interval 728), and increase duration of the assistance (e.g., increase the time interval 729).

Figure 7D:
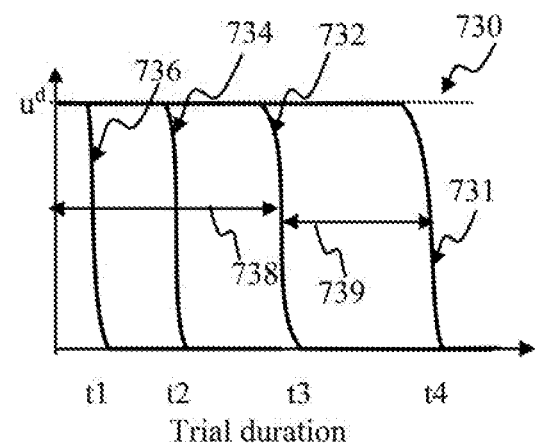
FIG. 7D is a plot depicting ramp-down modulated user input provided to a robotic device during one or more training trials for use, for example, with the target approach training of FIG. 6B, according to one or more implementations.

FIG. 7D illustrates ramp-down modulated user input provided to a robotic device during one or more training trials for use, for example, with the target approach training of FIG. 6B, according to one or more implementations. Individual curves 731, 732, 733, 734, 736 may depict user input during individual trials (e.g., 620, 624, 626, in FIG. 6B). By way of non-limiting illustration, the waveforms of FIG. 7D may be utilized as follows: at an initial trial (shown by the curve 731 in FIG. 7D) the user may guide the robotic device to navigate the trajectory assistance for a period 738 by providing control input 731 of amplitude 730. Upon determining robot's performance, the user may withdraw input for duration 739. During one or more subsequent trials, the user may decrease duration of the assistance (e.g., decrease the time interval 738).

Figure 7E:
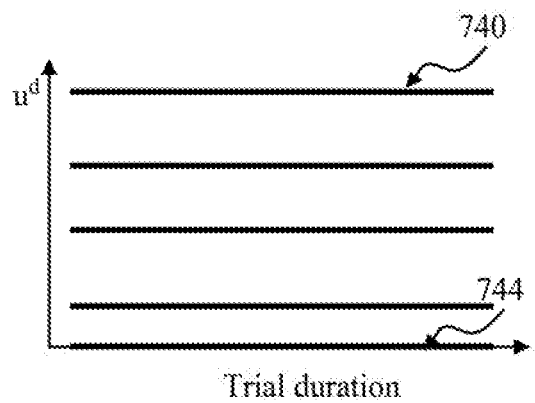
FIG. 7E illustrates user input, integrated over a trial duration, provided to a robotic device during one or more training trials for use, for example, with the target approach training of FIG. 6B, according to one or more implementations.

FIG. 7E illustrates user input, integrated over a trial duration, provided to a robotic device during one or more training trials for use, for example, with the target approach training of FIG. 6B, according to one or more implementations. As shown in FIG. 7E, a magnitude of the user input may decrease from initial input 740 of maximum magnitude to the final input 744 of lowest magnitude.

Figure 7F:
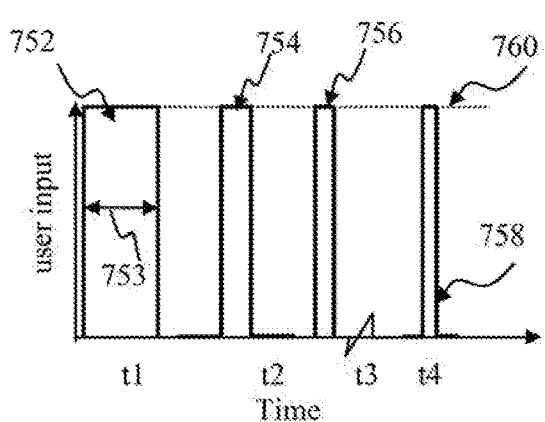
FIG. 7F is a plot depicting pulse width modulated user input of constant magnitude provided to a robotic device during one or more training trials for use, for example, with the target approach training of FIG. 6B, according to one or more implementations.

FIG. 7F illustrates pulse-width modulated and/or pulse-/frequency modulated user input of constant magnitude provided to a robotic device during one or more training trials for use, for example, with the target approach training of FIG. 6B, according to one or more implementations. At an initial trial (shown by the pulse 752 in FIG. 7F) the user may assist a robotic device to navigate the trajectory for a period 753. In some implementations, individual pulses (e.g., 752, 754, 756) may correspond to the user activating a control element (e.g., a holding down pedal, a joystick, a button, and/or other control elements element). Upon determining a robot's performance, the user may provide control input of reduced duration (e.g., the duration of pulses 754, 756, 756) during one or more subsequent trials.

Figure 7G:
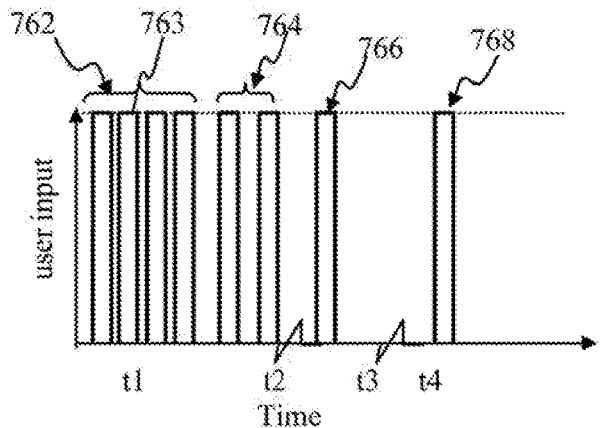
FIG. 7G is a plot depicting pulse frequency modulated user input provided to a robotic device during one or more training trials for use, for example, with the target approach training of FIG. 6B, according to one or more implementations.

FIG. 7G illustrates pulse frequency modulated user input provided to a robotic device during one or more training trials for use, for example, with the target approach training of FIG. 6B, according to one or more implementations. At an initial trial (shown by the pulse group 762 in FIG. 7F) the user may assist a robotic device to navigate the trajectory using plurality of pulses within the pulse group 762. In some implementations, individual pulses (e.g., pulse 763 in the pulse group 762) may correspond to the user activating a control element (e.g., tapping a pedal, engaging a joystick, clicking a button, and/or using another control other element). Upon determining a robot's performance, the user may provide control input of reduced frequency (e.g., reducing number of pulses in pulse groups 764, 766, 768 compared to the number of pulses in the pulse group 762) during one or more subsequent trials.

It may be appreciated by those skilled in the arts that the user input signal waveforms illustrated in FIGS. 7A-7G represent some implementations of the disclosure and other signals (e.g., bi-polar, inverted polarity, frequency modulated, phase modulated, code modulated, spike-encoding, audio, visual, and/or other signals) may be utilized for providing user input to a robot during training.

In one or more implementations, the input shown and described with respect to FIGS. 7A-7B, 7F-7G (and/or combinations thereof) may be utilized with predictive action methodology described in detail below with respect to FIGS. 8A-8B.

Figure 8A:
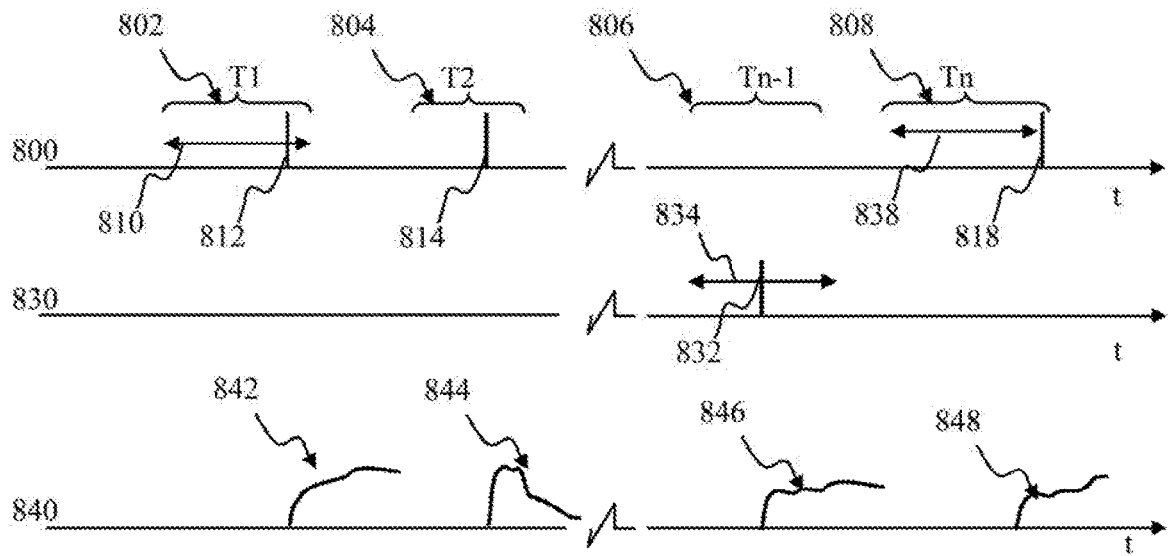
FIG. 8A is a graphical illustration of predictive action execution by an adaptive controller during training, in accordance with one or more implementations.
Figure 8B:
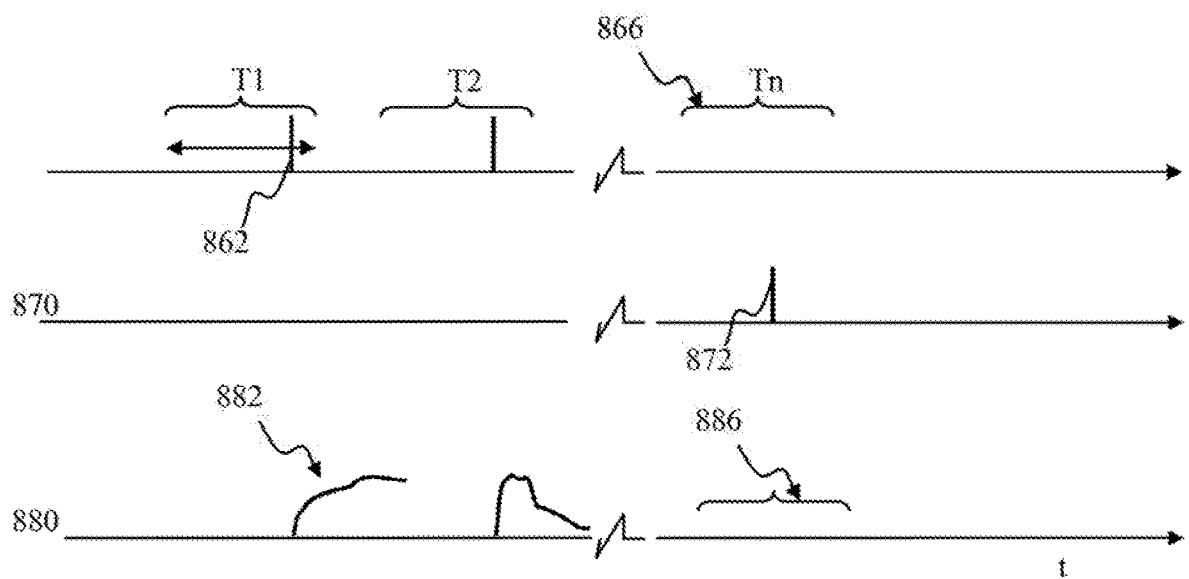
FIG. 8B is a graphical illustration of predictive action indication by an adaptive controller during training, in accordance with one or more implementations.

FIGS. 8A-8B illustrate predictive action execution/indication, respectively, performed by an adaptive controller during training, in accordance with one or more implementations. Methodologies Methodology shown and described with respect to FIGS. 8A-8B may be effectuated, e.g., by the adaptive controller 230, 270 of FIGS. 2B, 2C. Controller training may comprise a plurality of trials (e.g., the trials 620, 624, 626, 628 shown in FIG. 6B).

FIG. 8A illustrates learning of predictive action execution by an adaptive controller during training. In one or more implementations, the training may comprise teaching a robotic controller to generate a control output configured to perform a target action (e.g., target approach/obstacle avoidance). Training may be configured based on a sensory context (e.g., presence of the target/obstacle) in sensory input (e.g., 206 in FIG. 2A) and a teaching input. The teaching input may be provided by a teaching entity. In one or more implementations (not shown), the teaching input may comprise the control signal (e.g., the signal 842, 844, 848). In one or more implementations, the teaching entity may comprise a human and/or computerized agent.

Traces denoted 800, 830, 840 depict the teaching input (comprising action indications), a predicted action indication, and a control output, respectively, for a plurality of trials 802, 804, 806, 808. Individual trials may be characterized by a time window (e.g., 810) associated with the predictive action generation. In one or more implementations of obstacle avoidance or target approach, the time window 810 may be selected from the range between 0.1 and 5 for a robotic device moving at speeds between 0.5 and 10. The time window 810 may be referenced to an event. By way of non-limiting example, such an event may include, onset of the sensory context. The sensory context may include appearance of a target in camera view field and/or other sensory context.

One or more trials (e.g., 802, 804, 808) may be characterized by the presence of the teaching action indication (e.g., 812, 814, 818). The provision of the teaching input may be characterized by a wait interval relative to the onset of the stimulus. The interval may vary between individual trials and may be characterized by a minimum wait, median wait, mean wait, maximum wait, and/or other parameter (e.g., mean wait plus two standard deviations, and/or other interval duration). In one or more implementations wherein rapid response to the stimulus onset may be of benefit, the time window 810 may be configured in accordance with the minimum wait interval. In some implementations, a longer time window may be utilized configured (e.g, the mean wait plus two standard deviations).

Responsive to Upon detecting the presence of the teaching action indication (e.g., indications, 802, 804, 808), the adaptive controller may generate a control signal 842, 844, 848, respectively. The control signal may be configured to navigate a robot along the target trajectory (e.g., the trajectory 630 in FIG. 6B). The adaptive controller may be configured to develop an association between the context and the action (e.g., the control signal 830 and/or the action indication 800). In one or more implementations, the association development may be based on a supervised learning process, e.g., the process described with respect to FIGS. 2A-2C, supra. The association development may be characterized by a performance measure. Upon developing the association (e.g., as determined by attaining a target performance), the adaptive controller may be configured to generate the predicted action indication (e.g., 832). Responsive to the predicted action generation, the adaptive controller may be configured to generate a control signal (e.g., 846 in FIG. 8A) configured to execute the action by the robot. The predicted action generation may be characterized by a valid prediction interval (e.g., 834). In one or more implementations, the teacher may withhold providing the teaching input (e.g., as illustrated by the absence of the teaching action indication on the trace 800 within the trial 806). Responsive to lack of the predicted action indication generation by the controller, the teacher may provide the teaching input, e.g., the input 818 occurring upon expiration of the interval 838 in FIG. 8A.

The methodology of FIG. 8A may be illustrated using the following implementation of obstacle avoidance: a teacher may utilize a remote control device (e.g., as described in co-owned U.S. patent application Ser. No. 13/907,734 entitled "ADAPTIVE ROBOTIC INTERFACE APPARATUS AND METHODS", filed May 31, 2013, now U.S. Pat. No. 9,242,372, incorporated supra) and/or clicker apparatus described in co-owned U.S. patent application Ser. No. 13/841,980 entitled "ROBOTIC TRAINING APPARATUS AND METHODS", filed Mar. 15, 2013, now U.S. Pat. No. 8,996,177, the foregoing being incorporated herein by reference in its entirety) in order to indicate to a robotic device (e.g., 1160 in FIG. 11) to avoid an obstacle in its path (e.g., the object 1174). Responsive to receipt of the sensory context and the teaching indication the robotic device may perform an obstacle avoidance maneuver. Upon a successful completion of a series of trials (as may be judged by a performance margin, e.g., minimum distance to the object) adaptive controller of the robotic device may develop an association between the sensory context (e.g., object characteristics and/or location) and the action. Based on the association, the adaptive controller may be capable of generating the control signal (e.g., 846) and/or action indication (e.g., 832) prior to, or in lieu of, the teaching signal from the teacher. In some implementations, such predictive the control signal (e.g., 846) and/or action indication (e.g., 832) generation may be referred to as anticipation of the teaching input. In one or more implementations, the predicted action indication (e.g., 832) may precede the teaching input by 0.5 s to 5 s. Successful execution of obstacle avoidance by the robotic device in the absence of the teaching input may enable the robotic device to operate autonomously without requiring continuing attention/contribution from the teacher. In one or more implementations, upon detecting the predictive action execution by the robotic device, the teacher may continue to monitor the robot's operation. Responsive to observing one or more successful predictive action executions by the adaptive controller, the teacher may cease and/or suspend monitoring of the robotic device operation. Upon detecting an absence of the predictive action execution (e.g., as illustrated with respect to the trial 808 in FIG. 8A) the teacher may resume provision of the teaching input. In some implementations, monitoring mode adjustment by the teacher may be based on an expiration of a time period.

FIG. 8B illustrates learning of predictive action indication generation by an adaptive controller during training. During one or more trials, the teacher may provide teaching input (e.g., 862) configured to cause control signal generation (e.g., 882) for performing a target task. The adaptive controller described with respect to FIG. 8B, may be configured to provide a predictive action indication (872 on trace 870) to the teacher without necessitating the execution of the task (as indicated by the absence of control signal during duration 886 of the trial 866). In some implementations, responsive to detection of the predictive action indication the teacher may explicitly communicate to the adaptive controller whether to generate the control signal. In one or more implementations, such communication may be implied and/or inferred. By way of illustration of such inference, based on generating one or more predictive action indications, the adaptive controller may commence generation of the control signal provided it had not received an indication from the user to the contrary.

The methodology of FIG. 8A may be illustrated using the following implementation of target: a teacher may utilize a remote control device, e.g., as described in co-owned U.S. patent application Ser. No. 13/907,734 entitled "ADAPTIVE ROBOTIC INTERFACE APPARATUS AND METHODS", filed May 31, 2013, now U.S. Pat. No. 9,242,372, and/or clicker apparatus described in co-owned U.S. patent application Ser. No. 13/841,980 entitled "ROBOTIC TRAINING APPARATUS AND METHODS", filed Mar. 15, 2013, now U.S. Pat. No. 8,996,177, incorporated supra, in order to indicate to a robotic device (e.g., 1160 in FIG. 11) to approach a target (e.g., the object 1174). Responsive to receipt of the sensory context and the teaching indication the robotic device may perform a target approach maneuver. Upon a successful completion of a series of trials (as may be judged by a performance margin, e.g., minimum distance to the target) the adaptive controller of the robotic device may develop an association between the sensory context (e.g., object characteristics and/or location) and the action. Based on the association, the adaptive controller may be capable of generating the action indication (e.g., 872) prior to or in lieu of the teaching signal from the teacher. In some implementations, the action indication 872 may comprise a visual (e.g., LED flash), audio, radio, and/or another signal that may be detectable by the teacher and indicative that the adaptive controller has recognized the target to be approached. After detecting one or more indications (e.g., beeps) corresponding to the correct target, the teacher may indicated to the robot to commence approach (by, e.g., two or more consecutive clicks). In one or more implementations, the adaptive controller may begin to generate a target approach after reporting to one or more indications (e.g., beeps) and absent user indications to the contrary.

In one or more implementations, the prediction action generation functionality described herein may be effectuated using a remote control apparatus comprising an adaptive controller, e.g., the controller 230, 270 of FIGS. 2B-2C. In some implementations, the remote controller may comprise an adaptive controller apparatus configured in accordance with a robot phenotype, e.g., as described in detail in U.S. patent application Ser. No. 13/907,734 entitled "ADAPTIVE ROBOTIC INTERFACE APPARATUS AND METHODS", filed May 31, 2013, incorporated supra.

Figure 12:
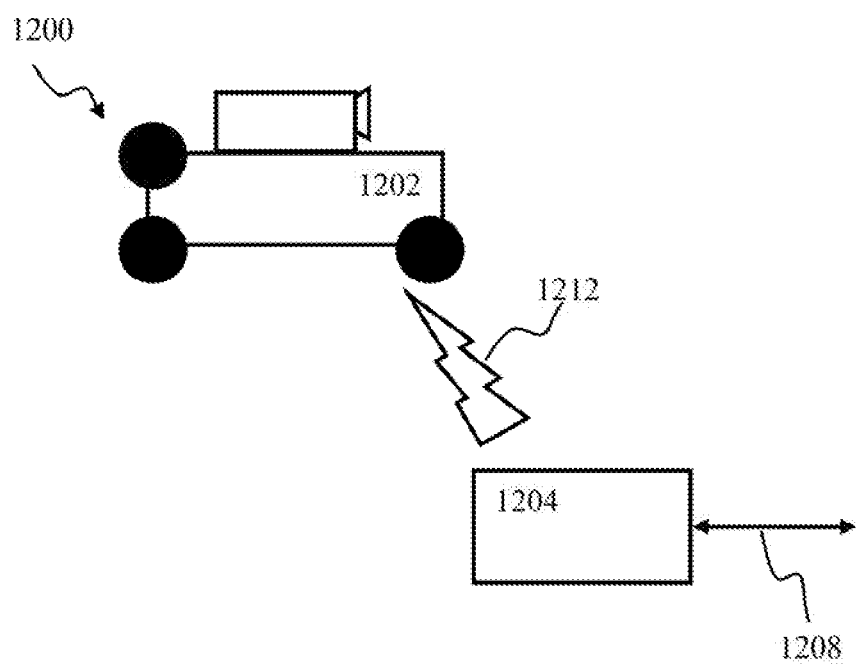
FIG. 12 is a functional block diagram depicting a computerized system comprising an adaptive robotic controller, according to one or more implementations.

FIG. 12 illustrates a computerized system comprising an adaptive robotic controller, according to one or more implementations. The system 1200 may comprise a robotic apparatus 1202 comprising one or more motorized operational elements (e.g., a wheel, an arm, a manipulator, leg, and/or other component). The robotic apparatus 1202 may be configured to operate in more than one spatial dimension and/or orientation. The robotic apparatus 1202 may comprise components configured to change their operational axis (e.g., with respect to vertical direction) based on the orientation of the robot platform. Such modifications may be effectuated by an end user of the robot during operation and/or assembly.

The robotic apparatus 1202 may communicate with a remote controller device 1204 via a remote link 1212. In one or more implementations, the robotic apparatus 1202 may comprise a mobile rover 1160 of FIG. 11 and/or another robot realization (e.g., bi-pedal humanoid robot). In some implementations, the remote controller 1204 may comprise an adaptable computerized user interface, e.g., as described in the above-referenced application '734. The remote interface 1212 may comprise any applicable wired remote interface (USB, Ethernet, Firewire, and/or other wired remote interface) and/or wireless remote interface (e.g., radio frequency, light, ultrasonic, and/or other remote interface technology).

The remote controller 1204 may be configured to implement adaptive control functionality, e.g., the adaptive controller 230, 270, 300 described above with respect to FIGS. 2B-2C, 3A, respectively. The remote controller 1204 may be configured to receive sensory context and teaching input. In some implementations, the sensory context may comprise a representation of a target and/or obstacle in video signal and/or actuator state provided by the robotic apparatus 1202 via the link 1212. The teaching input may be provided by a teaching entity (e.g., a user) and comprise an action indication (e.g., approach/avoid, go/stop, and/or other instruction to the adaptive controller). Responsive to receipt of the sensory context and/or the teaching action indication the adaptive controller may generate control signal configured to cause the robotic apparatus 1202 to perform the action (e.g., perform an obstacle avoidance maneuver).

Responsive to a successful completion of a series of trials (as may be judged by a performance margin, e.g., minimum distance to the object) the adaptive controller of the remote controller 1204 may develop an association between the sensory context (e.g., object characteristics and/or location) and the action. Based on the association, the adaptive controller may be capable of generating the control signal (e.g., 846 in FIG. 8A) and/or action indication (e.g., 832 in FIG. 8A) prior to, or in lieu of, the teaching signal from the teacher. Successful execution of the action (e.g., avoidance of the obstacle by the robotic apparatus 1202) in the absence of the teaching input may enable the controller 1204 to operate the robotic apparatus 1202 autonomously without requiring continuing attention and/or contribution from the teacher.

Operation of the control entity 212 (e.g., 212 in FIG. 2A) and/or the predictor (e.g., 222 in FIG. 2A) may be based on the input 206 (e.g., sensory context). As applied to the above illustration of training a rover to turn in response to, e.g., detecting an obstacle, as the rover executes the turn, the sensory input (e.g., the obstacle position with respect to the rover) may change. Predictor training wherein the sensory input may change is described below with respect to data summarized in Table 4, in accordance with one or more implementations.

Responsive to the control entity (e.g., a user) detecting an obstacle (sensory input state x1), the control signal (e.g., 208 in FIG. 2A) may comprise commands to execute a 45° turn. In some implementations, (e.g., described with respect to Table 1 supra) the turn maneuver may comprise a sudden turn (e.g., executed in a single command, e.g., Turn=45°). In some implementations, (e.g., described with respect to Table 2) the turn maneuver may comprise a gradual turn effectuated by two or more turn increments (e.g., executed in five commands, Turn=9°).

As shown in Table 4 during Trial 1, the control signal is configured at 9° throughout the training. The sensory, associated with the turning rover, is considered as changing for individual turn steps. Individual turn steps (e.g., 1 through 5 in Table 2) are characterized by different sensory input (state and/or context x1 through x5).

At presented in Table 4, during Trial 1, the predictor may be unable to adequately predict controller actions due to, at least in part, different input being associated with individual turn steps. The rover operation during Trial 1 may be referred to as the controller controlled with the controller performing 100% of the control.

TABLE 4

| Step # | State | Trial 1 | | | Trial 2 | | | Trial 3 | | |
|---|---|---|---|---|---|---|---|---|---|---|
| | | u° | u$^P$° | û° | u° | u$^P$° | û° | u° | u$^P$° | û° |
| 1 | x1 | 9 | 0 | 9 | 9 | 3 | 12 | 5 | 6 | 11 |
| 2 | x2 | 9 | 0 | 9 | 8 | 3 | 11 | 2 | 6 | 8 |
| 3 | x3 | 9 | 0 | 9 | 7 | 3 | 10 | 3 | 5 | 8 |
| 4 | x4 | 9 | 0 | 9 | 9 | 3 | 12 | 9 | 6 | 15 |
| 5 | x5 | 9 | 0 | 9 | 3 | 3 | 6 | 1 | 5 | 6 |
| Total | | 45 | 0 | 45 | 36 | 15 | 51 | 20 | 28 | 48 |

The Trial 2, summarized in Table 4, may correspond to another occurrence of the object previously present in the sensory input processes at Trial 1. At step 1 of Trial 2, the control signal may comprise a command to turn 9° based on appearance of the obstacle (e.g., x1) in the sensory input. Based on prior experience (e.g., associated with sensory states x1 through x5 of Trail 1), the predictor may generate predicted output u$^P$=3° at steps 1 through 5 of Trial 2, as shown in Table 4. In accordance with sensory input and/or plant feedback, the controller may vary control signal u at steps 2 through 5. Overall, during Trial 2, the predictor is able to contribute about 29% (e.g., 15° out of 51°) to the overall control signal u. The rover operation during Trial 2 may be referred to as jointly controlled by the control entity (e.g., a human user) and the predictor. It is noteworthy that neither the predictor nor the controller are capable of individually providing a target control signal of 45° during Trial 2.

The Trial 3, summarized in Table 4, may correspond to another occurrence of the object previously present in the sensory input processes at Trials 1 and 2. At step 1 of Trial 3, the control signal may reduce control signal 3° turn based on the appearance of the obstacle (e.g., x1) in the sensory input and/or prior experience during Trial 2, wherein the combined output u1' was in excess of the target 9°. Based on the prior experience (e.g., associated with sensory states x1 through x5 of Trials 1 and 2), the predictor may generate predicted output u$^P$=5°, 6° at steps 1 through 5 of Trial 3, as shown in Table 4. Variations in the predictor output u$^P$ during Trial 3 may be based on the respective variations of the control signal. In accordance with sensory input and/or plant feedback, the controller may vary control signal u at steps 2 through 5. Overall, during Trial 3, the predictor is able to contribute about 58% (e.g., 28° out of 48°) to the overall control signal û. The combined control signal during Trial 3 is closer to the target output of 48°, compared to the combined output (51°) achieved at Trial 2. The rover operation during Trial 2 may be referred to as jointly controlled by the control entity and the predictor. It is noteworthy, the neither the predictor nor the controller are capable of individually providing target control signal of 45° during Trial 3.

At a subsequent trial (not shown) the control signal may be reduced to zero while the predictor output may be increased to provide the target cumulative turn (e.g., 45°).

Training results shown and described with respect to Table 3-Table 4 are characterized by different sensory context (e.g., states x1 through x5) corresponding to individual training steps. Step-to-step sensory novelty may prevent the predictor from learning control signal during the duration of the trial, as illustrated by constant predictor output u$^P$ in the data of Table 3-Table 4.

Table 5 presents training results for an adaptive predictor apparatus (e.g., 222 of FIG. 2A) wherein a given state of the sensory may persist for two or more steps during a trial, in accordance with one or more implementations. Persistence of the sensory input may enable the predictor to learn control signal during the duration of the trial.

TABLE 5

| | | Trial | | |
|---|---|---|---|---|
| Step # | State | u° | u$^P$° | û° |
| 1 | x1 | 9 | 0 | 9 |
| 2 | x1 | 9 | 3 | 12 |
| 3 | x1 | 7 | 6 | 13 |
| 4 | x2 | 9 | 0 | 9 |
| 5 | x2 | 2 | 3 | 5 |
| Total | | 36 | 12 | 48 |

As shown in Table 5, sensory state x1 may persist throughout the training steps 1 through 3 corresponding, for example, a view of a large object being present within field of view of sensor. The sensory state x2 may persist throughout the training steps 4 through 5 corresponding, for example, another view the large object being present sensed.

At steps 1, 2 of Trial of Table 5, the controller may provide control signal comprising a 9° turn control command. At step 3, the predictor may increase its output to 3°, based on a learned association between the control signal u and the sensory state x1.

At step 3 of Trial of Table 5, the controller may reduce its output u to 7° based on the combined output u2'=12° of the prior step exceeding the target output of 9°. The predictor may increase its output based on determining a discrepancy between the sensory state x1 and its prior output (3°).

At step 4 of Trial of Table 5, the sensory state (context) may change, due to for example a different portion of the object becoming visible. The predictor output may be reduced to zero as the new context x2 may not have been previously observed.

At step 5 of Trial of Table 5, the controller may reduce its output u to 2° based on determining amount of cumulative control signal (e.g., cumulative turn) achieved at steps 1 through 4. The predictor may increase its output from zero to 3° based on determining a discrepancy between the sensory state x2 and its prior output u4$^P$=0°. Overall, during the Trial illustrated in Table 5, the predictor is able to contribute about 25% (e.g., 5° out of 48°) to the overall control signal 11.

Figure 9:
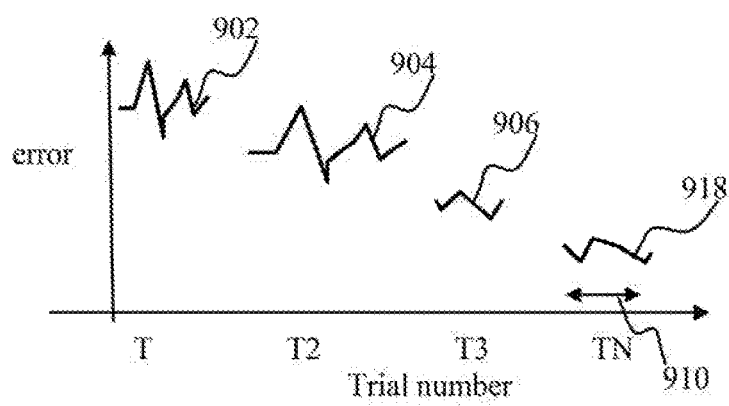
FIG. 9 is a plot illustrating performance of an adaptive robotic apparatus of, e.g., FIG. 2B, during training, in accordance with one or more implementations.

FIG. 9 illustrates training performance of an adaptive robotic apparatus of, e.g., FIG. 2B, by a user, in accordance with one or more implementations. Solid line segments 902, 904, 906, 908 denote error corresponding to a difference measure between the actual trajectory of the robot (e.g., 632, 634) versus the target trajectory (e.g., 630). Robot operation for a given trial duration (e.g., denoted by arrow 910) may be characterized by varying sensory state (e.g., states x1 through x5 described with respect to Table 2). In some implementations, the performance measure may comprise an error described as follows:

$$\Sigma(t_i) = |u^P(t_{i-1}) - u^d(t_i)| \quad \text{(Eqn. 15)}$$

In other words, the error may be determined based on (how well) the prior predictor output matches the current teaching (e.g., target) input. In one or more implementations, predictor error may comprise a root-mean-square deviation (RMSD), coefficient of variation, and/or other parameters.

As shown in FIG. 9, error diminishes as training progresses (e.g., with increasing trial number. In some implementations, the error may diminish through individual trials. The latter behavior may be related to a greater degree of sustained sensory experience by the predictor during learning responsive to consistent sensory input.

Various implementations, of methodology for training of robotic devices are now described. An exemplary training sequence of adaptive controller apparatus (e.g., 200 of FIG. 2A) may be expressed as follows:

During first trial at time T1:
the control entity may detect sensory input (e.g., 206, 216_1 in FIG. 2A) containing x1 and may generate output u1;
the predictor may receive the sensory input x1 (or a portion of thereof), and may be configured to generate predicted control signal (e.g., $u1^P=0°$);
the combiner may produce the combined output û1=45'; this output may be provided to the predictor as the teaching (target) signal at a subsequent time instance; and
the plant 210 may begin to turn right in accordance with the combined control signal (e.g., 220) û1=45°.

During another trial at time T2>T1:
the control entity may detect a sensory input (e.g., 206, 216_1 in FIG. 2A) containing x1 and may generate output u2=45°;
the predictor may receive the sensory input x1 (or a portion of thereof), and the teaching (target) signal û1=45° produced by the combiner at a prior trial (e.g., T1); the predictor may be configured to 'mimic' the combined output û; the predictor may be configured to generate predicted control signal (e.g., $u2^P=30°$) based on the sensory input, plant feedback and/or the teaching signal;
the combiner may produce the combined output û2=75° (e.g., in accordance with, for example, Eqn. 7); and
the plant 210 may increase the turn rate with the control signal û2.

During another trial at time T3>T2:
the control entity may determine that the rate of turn is in excess of the target turn of 45°, and may generate control signal u3=0°;
the predictor may receive the sensory input x (or a portion of thereof), and the teaching (target) signal û2=75° produced by the combiner at a prior trial (e.g., 12); the predictor may be configured to generate predicted control signal (e.g., u3P=50°) based on the sensory input, plant feedback and/or the teaching signal;
the combiner may produce the combined output û3=50° (e.g., in accordance with, for example, Eqn. 7); and
the plant 210 may execute the turn in accordance with the control signal û3.

Subsequently, at times T4, T5, TM>T2 the predictor output to the combiner 234 may result in the control signal 220 to turn the plant by 45° and the control signal 208 may be reduced to zero. In some implementations, the outcome of the above operational sequence may be referred to as (gradual) transfer of the control signal to the predictor output. When the predictor is capable to producing the target output, the control signal (e.g., 208 in FIGS. 2A-2B) may be withdrawn (removed). The output of the combiner (e.g., 214, 234) may comprise the predictor output in accordance with, for example, Eqn. 3.

In one or more implementations comprising spiking control and/or predictor signals (e.g., 208, 218, 248, 220, 240 in FIG. 2A-2B), the withdrawal of the control signal may correspond to the controller 208 generating spike output at a base (background) rate. By way of illustration, spike output at a (background) rate of 2 Hz may correspond to 'maintain course' control signal; output above 2 Hz may indicate a turn command. The turn rate may be encoded as spike rate, number of spikes, and/or spike latency in various implementations. In some implementations, zero signal (e.g., control signal 208, predicted control signal 218, and/or combiner output 220) may comprise a pre-defined signal, a constant (e.g., a dc offset or a bias), spiking activity at a mean-firing rate, and/or other zero signal.

Figure 10A:
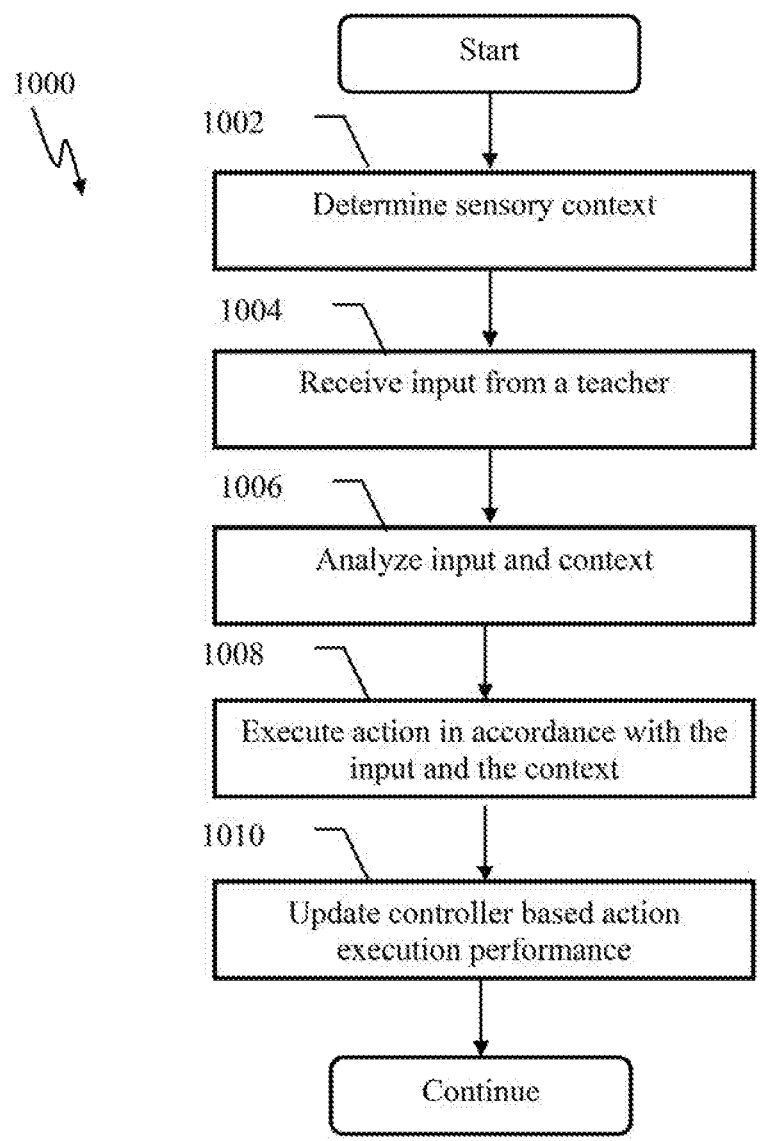
FIG. 10A is a logical flow diagram illustrating a method of operating an adaptive robotic device, in accordance with one or more implementations.
Figure 10B:
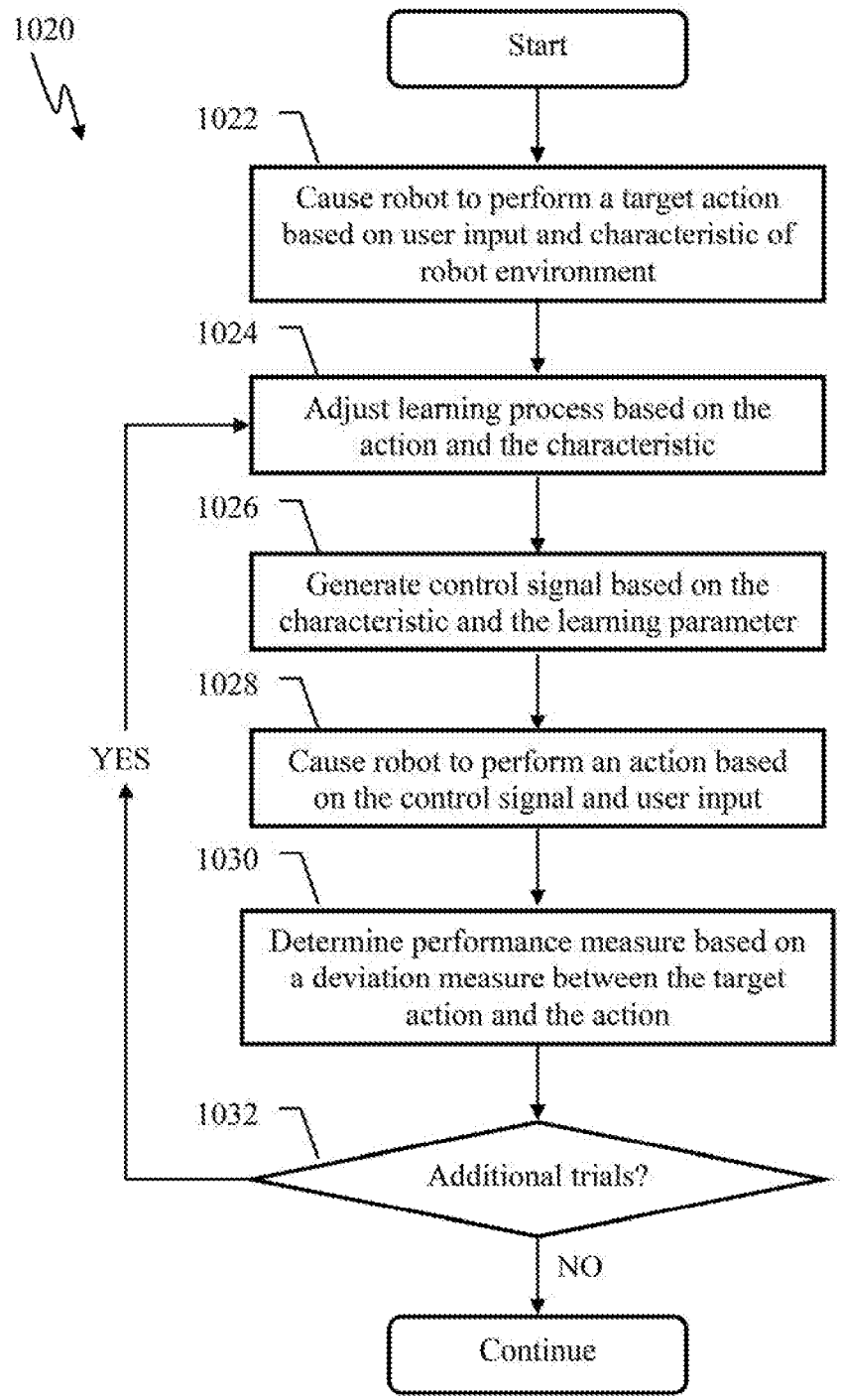
FIG. 10B is a logical flow diagram illustrating a method of training an adaptive robotic apparatus, in accordance with one or more implementations.
Figure 10C:
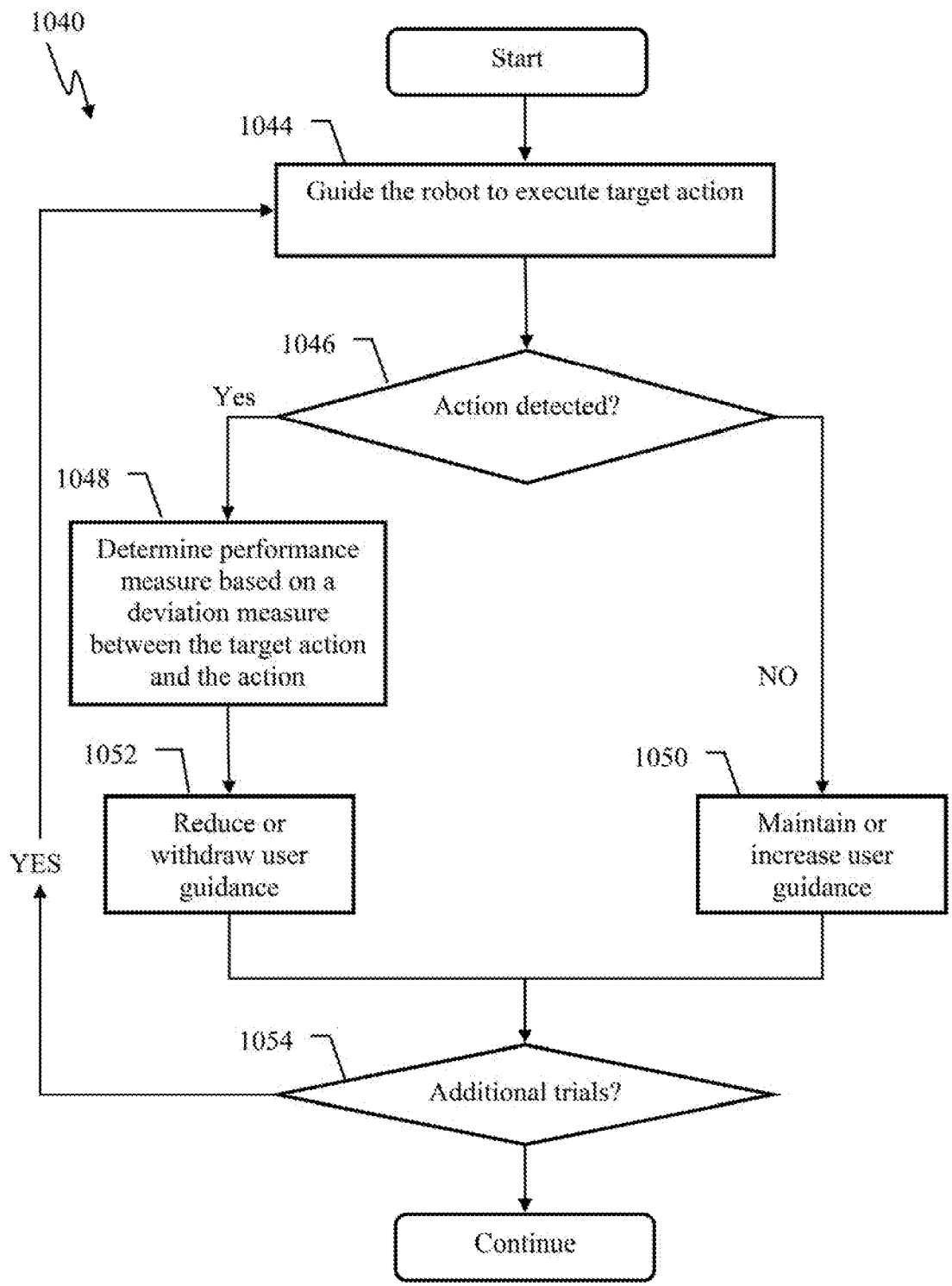
FIG. 10C is a logical flow diagram illustrating a method of predictive action execution by an adaptive robotic controller, in accordance with one or more implementations.

FIGS. 10A-10C illustrate methods of training an adaptive apparatus of the disclosure in accordance with one or more implementations. The operations of methods 1000, 1020, 1040 presented below are intended to be illustrative. In some implementations, methods 1000, 1020, 1040 may be accomplished with one or more additional operations not described, and/or without one or more of the operations discussed. Additionally, the order in which the operations of methods 1000, 1020, 1040 are illustrated in FIGS. 10A-10C described below is not intended to be limiting.

In some implementations, methods 1000, 1020, 1040 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 1000, 1020, 1040 in response to instructions stored electronically on an electronic storage medium. The one or more processing devices may include one or more devices configured through hardware, firmware, and/or software to be specifically designed for execution of one or more of the operations of methods 1000, 1020, 1040.

At operation 1002 of method 1000, illustrated in FIG. 10A sensory context may be determined. In some implementations, the context may comprise on or more aspects of sensory input (e.g., 206) and/or plant feedback (216 in FIG. 2A). In one or more implementations, the sensory aspects may include an object being detected in the input, a location of the object, an object characteristic (color/shape), a sequence of movements (e.g., a turn), a characteristic of an environment (e.g., an apparent motion of a wall and/or other surroundings, turning a turn, approach, and/or other environmental characteristics) responsive to the movement. In some implementations, the sensory input may be received based on performing one or more training trials (e.g., as the trials described with respect to Table 3-Table 5 above) of a robotic apparatus.

At operation 1004, an input may be received from a trainer. In some implementations, the input may comprise a control command (e.g., rotate right/left wheel and/or other command) configured based on the sensory context (e.g., appearance of a target in field of view of the robot's camera, and/or other sensory context) and provided by a human user.

In one or more implementations, the teacher input signal may comprise an action indications (e.g., proceed straight towards the target) provided by a computerized agent.

At operation 1006, the input and the context may be analyzed. In one or more implementations, the analyses of operation 1006 may comprise generation of a predicted control signal (e.g., 218 of FIG. 2A) may be based on the context (e.g., sensory input 206, plant feedback 216, and/or other context) and the control signal 208. The control signal may correspond to an output (e.g., 208) of controller. In some implementations, the predictor output may be based on an association between prior occurrences of (i) sensory context; (ii) teaching input; and/or state of the predictor learning process. The predicted output may comprise a motor control command (e.g., turn wheels by 9°). Operation 1006 may be executed as a part of a training trial (e.g., the trial 624 of FIG. 6B).

At operation 1008 of method 1000, an action may be executed in accordance with the input and the context. In one or more implementations, the action execution may be based on a combined control signal, e.g., the signal 240 generated by the combiner 214 in accordance with any of the methodologies described herein (e.g., using the transfer function of Eqn. 6).

At operation 1010 of method 1000, controller learning process may be updated based on a performance measure associated with executing the action at operation 1008. In one or more implementations, the performance may be determined based on a deviation between the target trajectory (e.g., 630 in FIG. 6B) and the actual trajectory accomplished during execution of the action at operation 1008. In one or more implementations, the performance may be determined based on an error measure of Eqn. 15. A control process update may comprise adaptation of weights of a computerized neuron network configured to implement the learning process. In some implementations, the learning process update may comprise an update of a look-up table.

FIG. 10B illustrates a method of training an adaptive robotic device, in accordance with one or more implementations. In some implementations, the training process illustrated in FIG. 10B may comprise a plurality of trials wherein during a given trial, the adaptive robotic device may attempt to follow a target trajectory.

At operation 1022 of method 1020 robot may perform a target action based on user input and characteristic of robot environment. In some implementations, the environment characteristic may comprise a relative positioning of the robot (e.g., 622, in FIG. 6B) and a target (e.g., 642, in FIG. 6B). The target action may comprise following a target trajectory (e.g., 630 in FIG. 6B). In one or more implementations, a human trainer may utilize a control interface (e.g., joystick) in order to guide the robot along the trajectory. The control interface may command the activity of robotic motor primitives, of action indications, and/or set points along the desired trajectory. In some implementations, operation 1022 may correspond to initial training trial (e.g., 620 of FIG. 6B).

At operation 1024, learning process of the robotic device may be adjusted based on the action and the characteristic. In one or more implementations, the adjustment may be based on a performance measure configured, e.g., based on a deviation between the target trajectory (e.g., 630 in FIG. 6B) and the actual trajectory accomplished during execution of the action at operation 1022. A control process update may comprise adaptation of weights of a computerized neuron network configured to implement the learning process. In some implementations, the learning process update may comprise an update of a LUT.

At operation 1026, a control signal may be generated by the robotic apparatus based on the characteristic and the updated learning process. In one or more implementations, the control signal may be generated by the adaptive predictor (e.g., 222 of FIG. 2A).

At operation 1028 of method 1020, the robot may perform an action based on the control signal and user input. In some implementations, the user input may comprise a control command (e.g., rotate right/left wheel) configured based on the sensory context (e.g., appearance of a target in field of view of the robot's camera) and provided by a human user. In one or more implementations, the teacher input signal may comprise an action indications (e.g., proceed straight towards the target) provided by a computerized agent.

At operation 1030 of method 1020, performance measure may be determined. In some implementations, the performance determination may be based on a deviation measure between the target action and the executed action. In one or more implementations, the performance may be determined based on an error measure of Eqn. 15. In some implementations, operation 1024, 1026, 1028, 1030 may correspond to one or more training trial (e.g., 624, 626, 628 of FIG. 6B).

At operation 1032, a determination may be made as to whether additional trials are to be performed. Responsive to a determination that additional trials are to be performed, the method 1020 may proceed to operation 1024.

FIG. 10C illustrates a method of collaborative learning, in accordance with one or more implementations. In some implementations, the collaborative learning process illustrated in FIG. 10C may comprise a plurality of trials, wherein during a given trial the adaptive robotic device may attempt to follow a target trajectory. The operation of the adoptive robotic device may be guided by a teacher so as to effectuate trajectory navigation wherein both the robot controller and the teacher contribute (in a non-trivial manner) to the control output being provided to the plant.

At operation 1044 of method 1040, a target trajectory execution may be demonstrated to the robotic device. In one or more implementations, the demonstration may comprise one or more of executing a sample program. The sample program may include a human user guiding the robot via a remote control and/or by hand. In some implementations, operation 1044 may correspond to the initial training trial (e.g., 620 in FIG. 6B).

At operation 1044, the action may be executed based on a collaboration between the robot and the user. In one or more implementations, the collaboration may be based on a combiner (e.g., 214) configured to combine user control signal with the predicted control signal.

At operation 1046 of method 1040, a performance measure may be determined. In some implementations, the performance measure determination may be based on a deviation measure between the target action and the executed action. In one or more implementations, the performance measure may be determined based on an error measure of Eqn. 15. In some implementations, operation 1024, 1026, 1028, 1030 may correspond to one or more training trial (e.g., 624, 626, 628 of FIG. 6B).

At operation 1048 a determination may be made as to whether performance at operation 1044 has improved compared to the performance at achieved at operation 1044 (the target trajectory).

Responsive to the determination at operation 1048 that the performance has not improved, the user control input may be maintained and/or increased at operation 1050.

Responsive to the determination at operation 1048 that the performance has improved, the user control input may be reduced at operation 1052.

At operation 1054, a determination may be made as to whether additional trials are to be performed. Responsive to a determination that additional trials are to be performed, the method 1020 may proceed to operation 1044.

Figure 11:
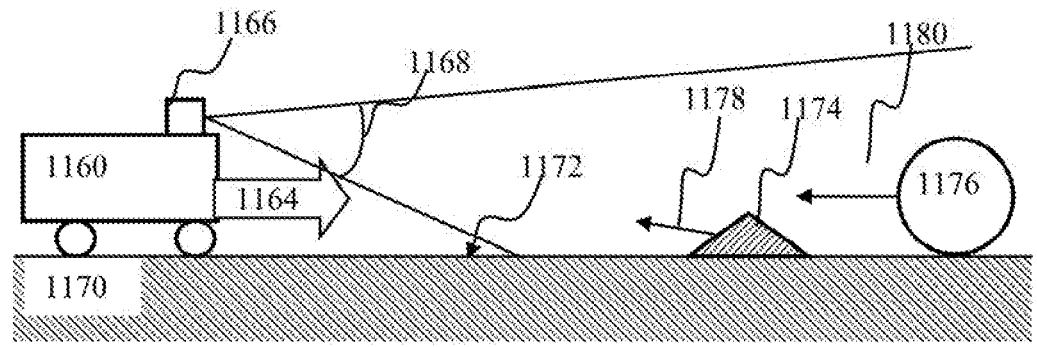
FIG. 11 is a graphical illustration depicting robotic apparatus comprising an adaptive controller apparatus of the disclosure configured for obstacle avoidance, in accordance with one or more implementations.

FIG. 11 illustrates a mobile robotic apparatus that may comprise an adaptive controller (e.g., the controller for FIG. 2A). The robotic apparatus 1160 may comprise a camera 1166. The camera 1166 may be characterized by a field of view 1168. The camera 1166 may provide information associated with objects within the field of view. In some implementations, the camera 1166 may provide frames of pixels conveying luminance, refreshed at 25 Hz frame rate.

One or more objects (e.g., an obstacle 1174, a target 1176, and/or other objects) may be present in the camera field of view. The motion of the objects may result in a displacement of pixels representing the objects within successive frames, such as described in co-owned U.S. patent application Ser. No. 13/689,717, entitled "APPARATUS AND METHODS FOR OBJECT DETECTION VIA OPTICAL FLOW CANCELLATION", filed Nov. 29, 2012, now U.S. Pat. No. 9,193,075, incorporated, supra.

When the robotic apparatus 1160 is in motion, such as shown by arrow 1164 in FIG. 11, the optical flow estimated from the image data may comprise the self-motion component and the object motion component. By way of a non-limiting example, the optical flow measured by the rover of FIG. 11B may comprise one or more of (i) self-motion components of the stationary object 1178 and the boundary (e.g., the component 1172 associated with the floor boundary); (ii) component 1180 associated with the moving objects 116 that comprises a superposition of the optical flow components due to the object displacement and displacement of the robotic apparatus, and/or other components. In one or more implementation, the robotic apparatus 1160 may be trained to avoid obstacles (e.g., 1174) and/or approach targets (e.g., 1176) using collaborative learning methodology of, e.g., FIG. 6B

Various exemplary computerized apparatus may be utilized with the robotic training methodology of the disclosure. In some implementations, the robotic apparatus may comprise one or more processors configured to execute the adaptation methodology described herein. In some implementations, an external processing entity (e.g., a cloud service, computer station and/or cluster) may be utilized in order to perform computations during training of the robot (e.g., operations of methods 1000, 1020, 1040).

Robot training methodologies methodology described herein may advantageously enable training of robotic controllers. In some implementations, training of the robot may be based on a collaborative training approach wherein the robot and the user collaborate on performing a task. Initially, a user may guide a robot through and/or demonstrate to a robot the target task.

The collaborative training approach described herein may advantageously enable users to train robots characterized by complex dynamics wherein description of the dynamic processes of the robotic platform and/or environment may not be attainable with precision that is adequate to achieve the target task (e.g., arrive to a target within given time). The collaborative training approach may enable training of robots in changing environment (e.g., train a vacuum cleaner robot to avoid displaced and/or newly placed objects while cleaning newly vacant areas).

The methodology described herein may enable users without robotic experience (e.g., children) to train robotic devices through repetition. Users who may be training experts (e.g., working with dogs, horses) may apply their training knowledge via the collaborative training of robotic devices.

In one or more implementations, training methodologies described herein may be applied to robots learning their own kinematics and/or dynamics (e.g., by the robot learning how to move its platform). An adaptive controller of the robot may be configured to monitor the discrepancy and once one or more movements in a given region of the working space are learned, the controller may attempt to learn other movements. In some implementations, the controller may be configured to learn consequences of robot actions on the world. For example, responsive to the robot pushing an object, the controller may learn to predict the consequences (e.g., if the push is too weak nothing may happen (due to friction); if the push is stronger, the object may start moving with an acceleration being a function of the push force).)

In some sensory-driven implementations, the controller may be configured to learn associations observed between two or more sensory inputs. In one or more safety applications, the controller may be configured to observe action of other robots that may result in states that may be deemed dangerous (e.g., result in the robot being toppled over) and/or safe. Such approaches may be utilized in robots learning to move their body and/or learning to move or manipulate other objects.

In one or more implementations, the adaptive controller capability to generate control signal prior to, or in lieu of, the teaching input may enable autonomous operation of the robot and/or obviate provision of the teaching input. In some applications, wherein a teacher controls and/or trains multiple entities (e.g., multiple controllers 300 of FIG. 3A), it may be advantageous to obviate a provision of the teaching input to one or more entities so as to enable the teacher to focus on the remaining entities.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A computerized controller apparatus configured to control of a robotic device, the apparatus comprising:
one or more processors configured to execute computer program modules to cause the one or more processors to:

(1) during one or more first training trials:
  determine a first control signal of a plurality of first control signals based on (i) a characteristic of an input provided to the controller apparatus by a sensor of the robotic device and (ii) a user input, and
  cause the robotic device to perform a first action based on the given first control signal, the first action being characterized by a first performance; and
(2) during a training trial subsequent to the one or more first training trials:
  determine a second control signal based on the characteristic of the input and the first performance, and
  cause the robotic device to perform a second action based on the second control signal;
wherein the second control signal is determined absent of a provision of user input and subsequent to termination of the one or more first training trials.

2. The apparatus of claim 1, wherein:
the first performance is determined based on a proximity measure between the first action and a target action; and
the second action is characterized by a second performance determined based on a proximity measure between the second action and the target action.

3. The computerized controller apparatus of claim 2, wherein,
the target action is specified by the user input.

4. The computerized controller apparatus of claim 3, wherein,
the proximity measures are measured based on a difference between a plant state of the robotic device and a target plant state specified by the target action.

5. The computerized controller apparatus of claim 3, further configured to execute computer program modules to:
determine a predicted control signal during the one or more first trials and the trial subsequent the one or more first trials based on the user input;
wherein,
during the one or more first trials, the predicted control signal is gated based on the user input;
during the trial subsequent the one or more first trials, the predicted control signal is ungated; and
the second control signal is determined based on the predicted control signal.

6. The computerized controller apparatus of claim 5, wherein,
gating the predicted control signal causes the first action to be performed entirely based on the user input provided to the controller apparatus.

7. The computerized controller apparatus of claim 1, wherein,
the characteristic of the input corresponds to a detection of an object by a sensor of the robot.

8. A robotic device, comprising:
a non-transitory computer readable storage medium having computer program modules stored thereon; and
one or more processors configured to execute the computer program modules to cause the one or more processors to:
(1) during one or more first training trials:
  determine a first control signal of a plurality of first control signals based on (i) a characteristic of an input provided to the controller apparatus by the robotic device and (ii) a user input; and
  cause the robotic device to perform a first action based on the given first control signal, the first action being characterized by a first performance; and
(2) during a training trial subsequent to the one or more first training trials:
  determine a second control signal based on the characteristic of the input and the first performance; and
  cause the robotic device to perform a second action based on the second control signal;
wherein the second control signal is determined absent of a provision of user input subsequent to termination of the one or more first training trials.

9. The robotic device of claim 8, wherein:
the first performance is determined based on a proximity measure between the first action and a target action; and
the second action is characterized by a second performance determined based on a proximity measure between the second action and the target action.

10. The robotic device of claim 9, wherein,
the target action is specified by the user input.

11. The robotic device of claim 9, wherein,
the proximity measures is measured based on a difference between a plant state of the robotic device and a target plant state specified by the target action.

12. The robotic device of claim 8, wherein,
the characteristic of the input corresponds to a detection of an object by a sensor of the robot.

13. The robotic device of claim 8, wherein the one or more processors are further configured to execute computer program modules to:
determine a predicted control signal during the one or more first trials and the trial subsequent the one or more first trials based on the user input;
wherein,
during the one or more first trials, the predicted control signal is gated based on the user input;
during the trial subsequent the one or more first trials, the predicted control signal is ungated; and
the second control signal is determined based on the predicted control signal.

14. The robotic device of claim 13, wherein,
the gated predicted control signal causes the first action to be performed entirely based on the user input provided to the controller apparatus.

* * * * *